(12) United States Patent
Shinichi et al.

(10) Patent No.: US 6,438,708 B1
(45) Date of Patent: Aug. 20, 2002

(54) INFORMATION PROCESSING APPARATUS THAT CAN HOLD INTERNAL INFORMATION

(75) Inventors: Sawamura Shinichi, Yokohama; Nobuhiko Hara, Ebina; Jun Kitahara, Yokohama; Masaya Umemura, Fujisawa; Masato Ishii, Yokohama; Kenichi Saitou, Tokyo, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/188,246

(22) Filed: Nov. 9, 1998

(30) Foreign Application Priority Data

Nov. 7, 1997 (JP) .............................................. 9-305198

(51) Int. Cl.[7] .............................. G06F 11/32; G06F 1/30
(52) U.S. Cl. ......................................... 714/15; 713/324
(58) Field of Search ..................... 714/15, 14; 713/300, 713/320, 323, 324, 340; 709/300; 710/74, 260; 711/100; 365/226

(56) References Cited

U.S. PATENT DOCUMENTS

| | | | | |
|---|---|---|---|---|
| 4,161,026 A | * | 7/1979 | Wilhite | |
| 5,361,337 A | * | 11/1994 | Okin | |
| 5,715,464 A | * | 2/1998 | Crump et al. | |
| 5,778,221 A | * | 7/1998 | Temple | |

FOREIGN PATENT DOCUMENTS

| | | |
|---|---|---|
| JP | 62139020 | 6/1987 |
| JP | 358205 | 3/1991 |
| JP | 8234876 | 9/1996 |
| JP | 8297530 | 11/1996 |

* cited by examiner

*Primary Examiner*—Gopal C. Ray
(74) *Attorney, Agent, or Firm*—Antonelli, Terry, Stout & Kraus, LLP

(57) ABSTRACT

An information processing apparatus includes a volatile storage unit and a nonvolatile storage device for storing at least algorithm information for processings executed by the processing unit, processed data inclusive of display-destined data generated in the storage unit and circuit state information concerning individual circuits incorporated in the information processing apparatus during operation of the information processing apparatus, and a control unit for setting a predetermined operation-mode state in accordance with predetermined rules of state transition so as to store selectively the algorithm information, the processed data and the circuit state information in the volatile storage unit and nonvolatile storage device in dependence on the conditions imposed externally through manipulation of the apparatus, whereby the time required for activating or resuming the information processing apparatus is reduced.

46 Claims, 15 Drawing Sheets

FIG.3 INFORMATION PROCESSING APPARATUS (SLEEPING STATE)

FIG.5
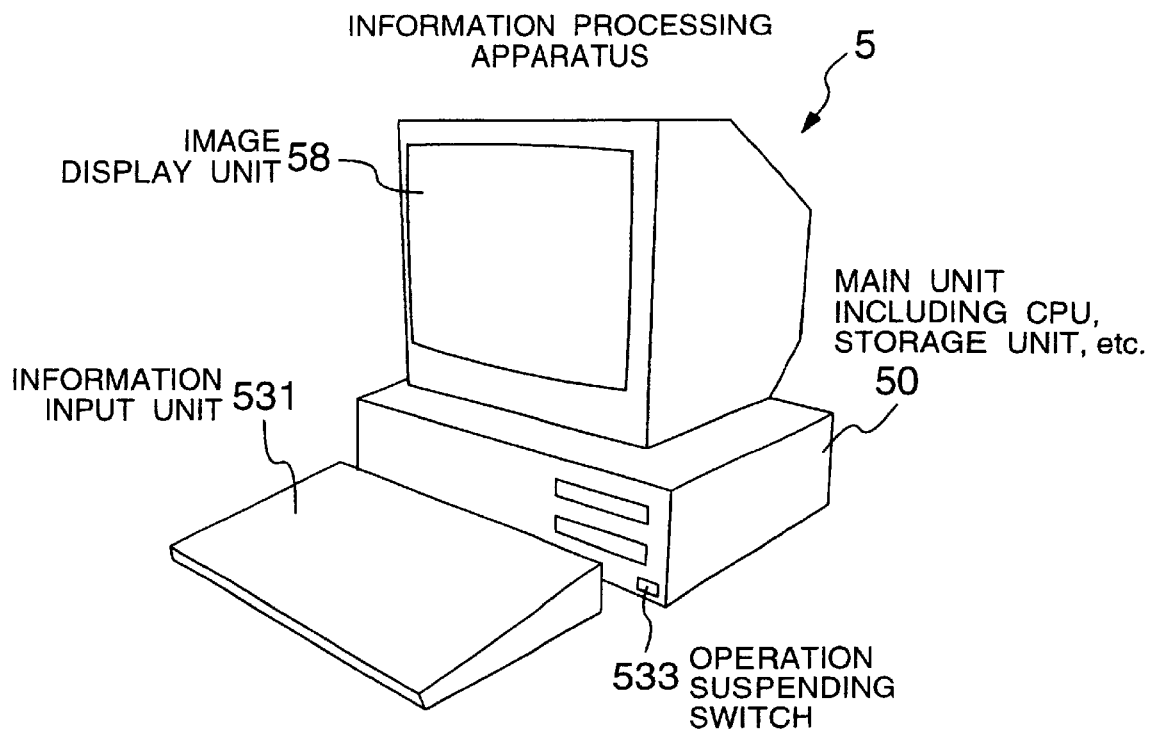
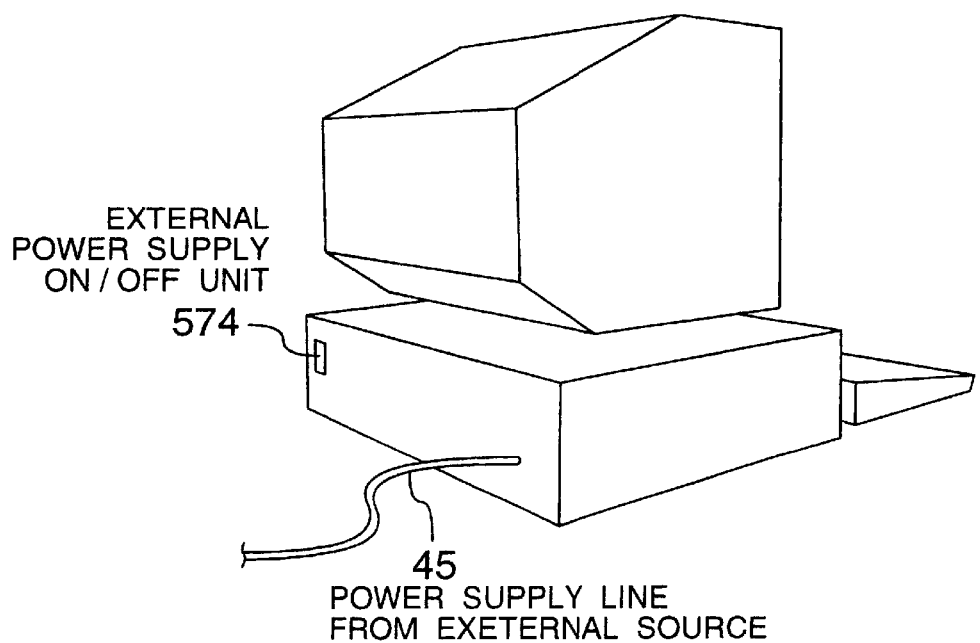

VALUES OF ACTIVATION FLAG F AND FUNCTIONS

| ACTIVATION FLAG F | FUNCTION |
|---|---|
| 0 | INITIAL VALUE |
| 1 | ORDINARY HIBERNATION FILE |
| 2 | OS-ACTIVATION-RELATED HIVERNATION FILE |
| 3 | START OF CREATION OF HIBERNATION FILE |
| 4 | RESTORATION OF HIBERNATION FILE |

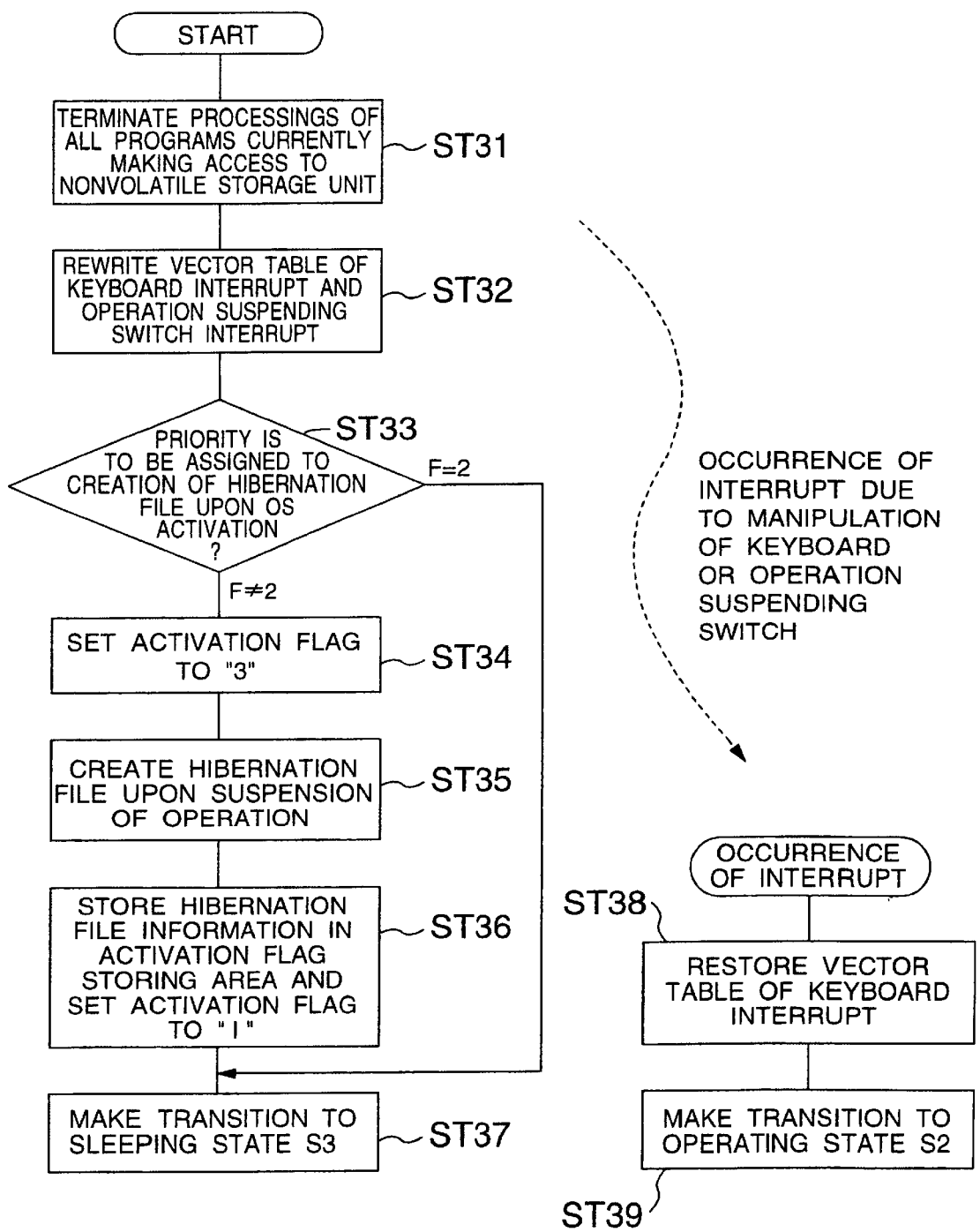

FIG.16
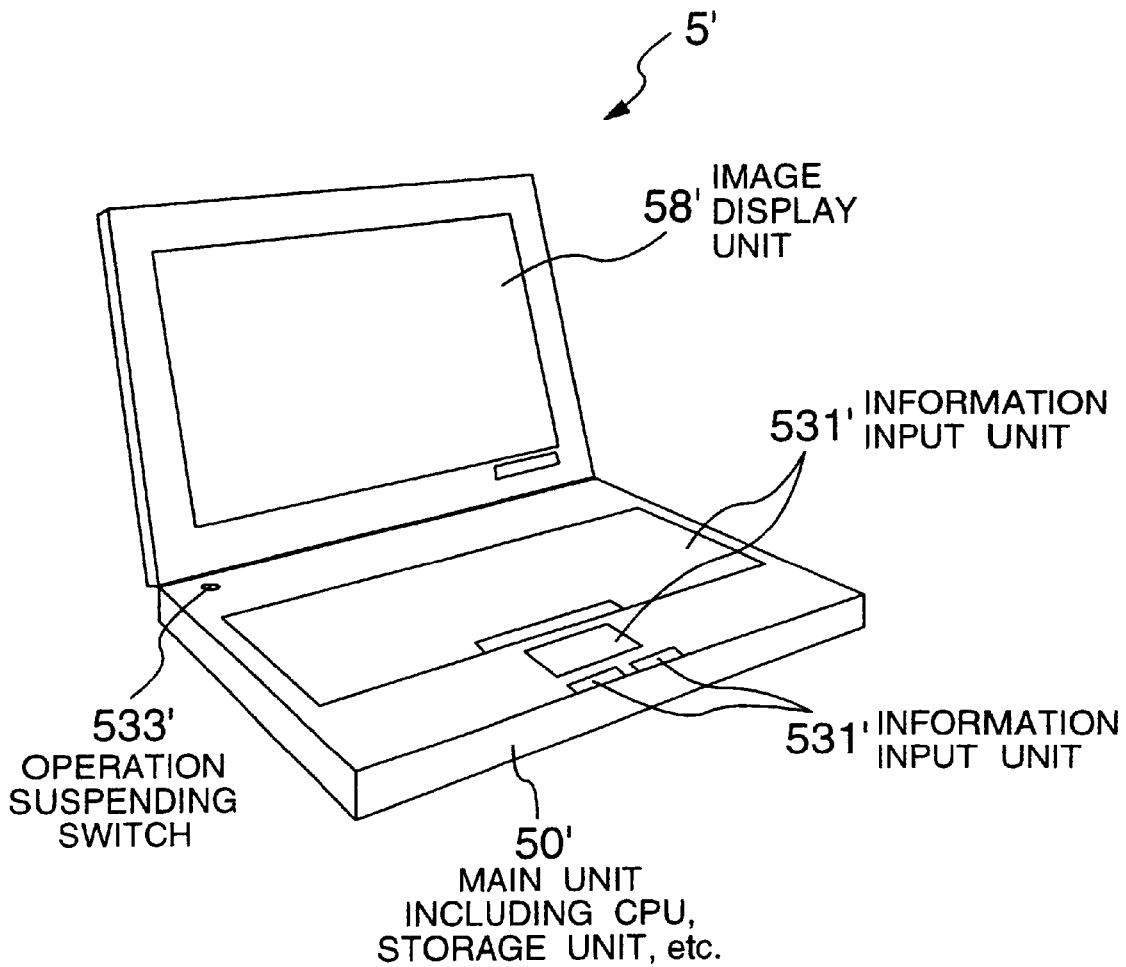
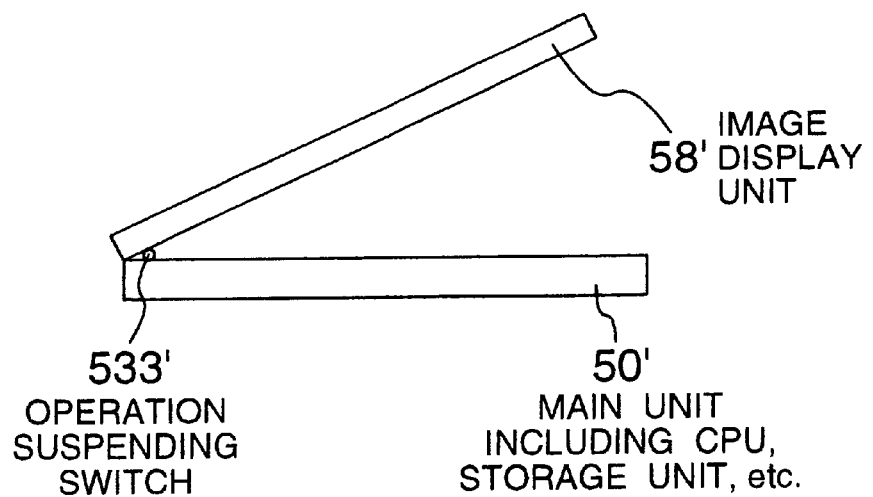

INFORMATION PROCESSING APPARATUS THAT CAN HOLD INTERNAL INFORMATION

BACKGROUND OF THE INVENTION

The present invention relates generally to an information processing apparatus such as desk-top type personal computers, portable type personal computers, word processors and the like. More particularly, the invention is concerned with a system for reducing a time involved in starting (or restarting) or activating operation of such information processing apparatus from a stopped state or a suspended state.

In the information processing apparatus such as mentioned above, it is known to save internal information of the information processing apparatus when the operation thereof is to be suspended. By way of example, there is disclosed in JP-A-8-76872 such arrangement that when a voltage supplied to an information processing apparatus from a battery is high, a so-called active suspension is validated with the contents of a volatile storage unit being held as it is, while when the supply voltage is low, a so-called 0V-suspension is effectuated with the contents of the volatile storage unit being saved onto a nonvolatile storage device.

Further, in JP-A-8-87366, such scheme is proposed according to which the system state is periodically stored in a hard disk device at predetermined time points (referred to as the check point) with a view to making it possible to restore the system state on the basis of the data stored in the hard disk device when external AC power supply is unexpectedly broken.

SUMMARY OF THE INVENTION

It is an object of the present invention to provide an information processing apparatus having enhanced operation efficiency or performance because of reduction of a time taken for activating or starting or resuming operation of the information processing apparatus from an operation-suspended state or a stopped state.

In view of the above and other objects which will become apparent as the description proceeds, the present invention is directed to an information processing apparatus which includes a volatile storage unit and a nonvolatile storage device for holding or storing information concerning internal states when the information processing apparatus is operating. The information processing apparatus provide an arrangement that even when operation of the information processing apparatus once put into operation with an operating system or OS (Operating System) program and others having been activated is suspended in response to a command inputted through an appropriate manipulation unit by user, the internal information prevailing in the information processing apparatus immediately before the suspension of operation thereof can remain, being held intact continuously.

As the internal information, there may be mentioned algorithm information inclusive of an operating system or OS program and processing programs executed by a processing unit, processed data inclusive of data for display (or display-destined data) as generated in a storage unit, and circuit state information concerning the states of the electronic circuits incorporated in the information processing apparatus.

Thus, according to a general aspect of the present invention, there is provided an information processing apparatus having at least a processing unit, a storage unit and a display unit, including a volatile storage unit and nonvolatile storage unit for storing at least algorithm information for processings executed by the processing unit, processed data inclusive of display-destined data generated in the storage unit, and circuit state information concerning individual circuits incorporated in the information processing apparatus during operation of the information processing apparatus, and a control unit for setting a predetermined operation-mode state in accordance with predetermined rules of transition so as to store selectively the algorithm information, the processed data and the circuit state information in the volatile storage unit and the nonvolatile storage unit in dependence on the conditions imposed externally through manipulating operation performed by user.

In a preferred mode for carrying out the present invention, there may be provided an external power supply, detecting unit and an internal state transition storing unit, wherein the state to which transition is to be made is selectively determined in consideration of manipulation of a start/stop unit performed by the user, the external power supply state and the preceding state transition.

In another mode for carrying out the invention, there may be provided a sleeping state and a hibernating state as the state for holding continuously the internal information.

In yet another mode for carrying out the invention, such arrangement may be adopted that the information processing apparatus can make transition to the sleeping state from the hibernating state in case the external power supply is available for a lengthened time period by way of an AC adaptor or the like connected to the information processing apparatus.

In still another mode for carrying out the invention, the information processing apparatus may incorporate a power storage unit such as a battery or the like, so that when external power supply by way of the AC adaptor or the like is cut or broken abruptly, the information processing apparatus can make transition to the hibernating state by utilizing electric power supplied from the power storage unit.

Further, there may be provided a time measuring unit capable of operating even in the sleeping state.

According to the teachings of the present invention, the information stored in the volatile storage unit incorporated in the information processing apparatus is saved to the nonvolatile storage as a file at a given time point after the activation of the information processing apparatus. This file will be referred to as the hibernation file #1.

Further, the information contained in the volatile storage unit may be saved to the nonvolatile storage device as a file instantaneously when the user performs manipulation for suspending work in the course of operation of the information processing apparatus. In that case, when the user performs operation for restarting the work, then the save processing mentioned above is stopped immediately, whereon the operating state is restored. If otherwise, the save processing is continued. The file of the information saved to the nonvolatile storage unit is referred to as the hibernation file #2.

When the external power supply to the information processing apparatus continues after the saving of the information to the nonvolatile storage unit upon suspension of operation, the power supply to the volatile storage unit is not stopped, but the power supply to those circuits or devices which bear no relation to the function for restoring the state prevailed upon suspension of operation is stopped. This state is referred to as the sleeping state.

When the user performs operation for resuming the work before the power supply to the information processing apparatus is interrupted, the power supply to all the components of the information processing apparatus is restarted for allowing the information processing apparatus to restore the state prevailed before it was suspended.

When the power supply to the information processing apparatus in the sleeping state is broken due to opening of a breaker or for other reason, the information stored in the volatile storage unit during operation of the information processing apparatus is lost. Thus, the information processing apparatus assumes the state in which only the information saved to the nonvolatile storage unit upon suspension of operation is available. This state will be referred to as the hibernating state hereinafter.

When the external power supply to the information processing apparatus is restarted in the hibernating state, the internal information (hibernation file #2) saved to the nonvolatile storage unit upon suspension of operation is automatically restored to the volatile storage unit, whereupon the information processing apparatus assumes the sleeping state. In case where the information processing apparatus failed to restore the hibernation file #2 onto the volatile storage unit or when the user commands restoration of the state prevailed before the suspension of operation, the hibernation file #1 is restored onto the volatile storage unit, whereupon the information processing apparatus assumes the sleeping state.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 5 is a perspective view showing schematically an outer appearance of an information processing apparatus according to an embodiment of the present invention;

FIG. 11 is a flow chart for illustrating processings executed in a hibernation file creating state of the information processing apparatus according to the second embodiment of the invention;

FIG. 16 is a view showing an outer appearance of a portable-type information processing apparatus according to a third embodiment of the present invention.

DESCRIPTION OF THE PREFERRED EMBODIMENTS

The present invention will now be described in detail in conjunction with what is presently considered as preferred or typical embodiments thereof by reference to the drawings.

Embodiment 1

A first embodiment of the information processing apparatus according to the present invention will be described by referring to FIGS. 1 to 4.

Figure 1:
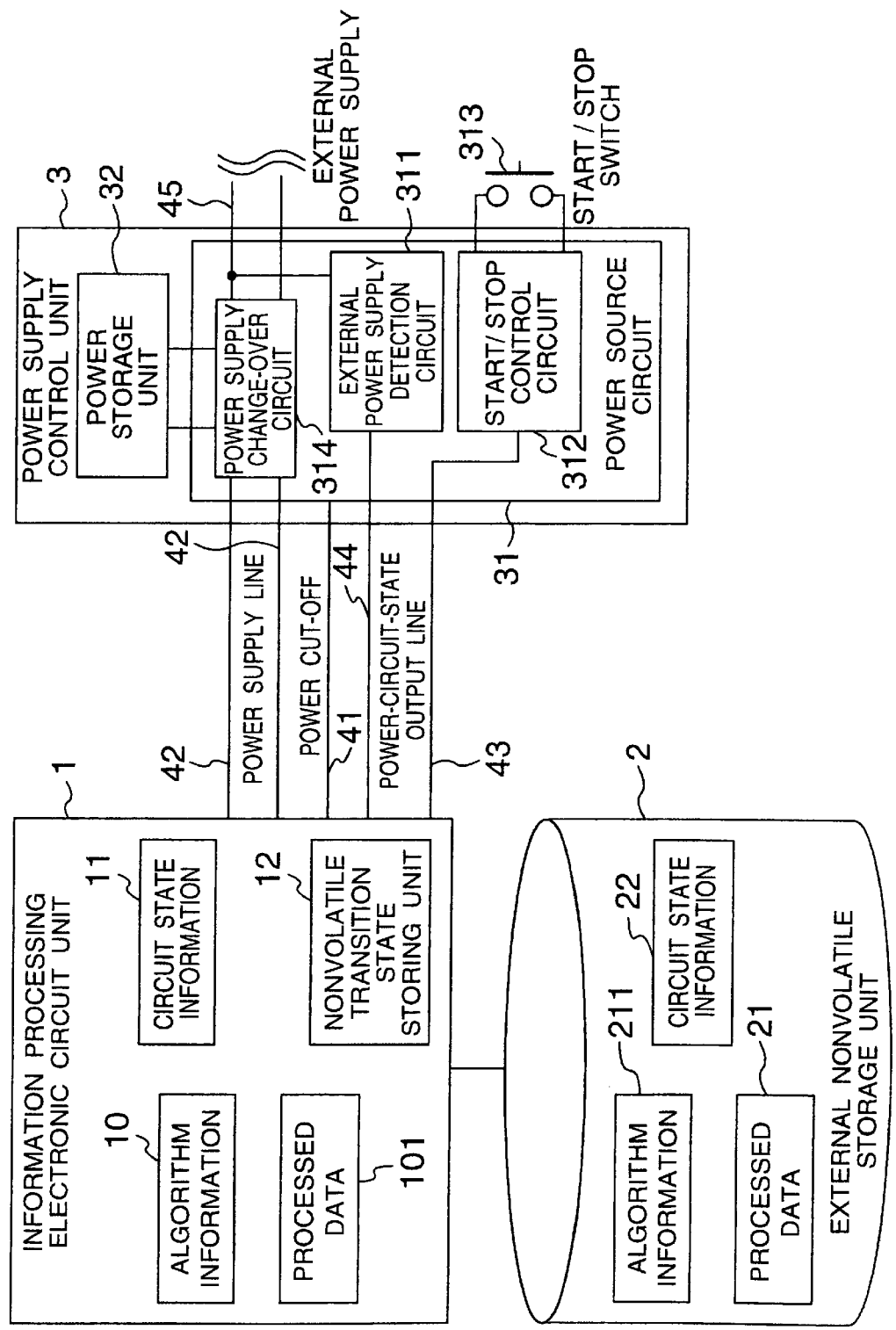
FIG. 1 is a functional block diagram showing schematically and functionally a system configuration of an information processing apparatus (in an operating state) according to a first embodiment of the present invention.

FIG. 1 is a functional block diagram showing schematically and functionally a configuration of the information processing apparatus according to the first embodiment of the invention and shows major parts thereof, inclusive of an information processing electronic circuit unit, a power supply control unit and an external nonvolatile storage unit together with information or data to be handled or processed.

It is first to be mentioned that the information processing apparatus according to the first embodiment of the invention includes at least an information processing electronic circuit unit 1, an external nonvolatile storage unit 2 and a power supply control unit 3.

The information processing electronic circuit unit 1 incorporates therein a volatile storage unit which is destined for storing algorithm information 10 including an operating system program or OS program in short and processing programs, processed data 101 inclusive of display-destined data and circuit state information 11 concerning the states of the circuits individual which are incorporated in the information processing apparatus.

Further, the information processing electronic circuit unit 1 incorporates therein a rewritable nonvolatile transition state storing unit 12 for storing transitions of the states of the information processing apparatus. The transition state storing unit 12 may be constituted by a battery backup memory or a flash memory. Further, the transition state storing unit 12 is adapted to store identifying information concerning the current internal state of the information processing apparatus and the internal state prevailed before the transition was made to the current state.

The external nonvolatile storage unit 2 has a processed data storing area 21, a circuit state information storing area 22, and an algorithm information storing area 211 as storage areas for storing the volatile information to be handled by the information processing electronic circuit unit 1.

On the other hand, the power supply control unit 3 is comprised of a power source circuitry 31 and a built-in power storage unit 32 such as a battery and equipped with a cable 45 designed to be connected to an external electric power supply unit, and a power supply line 42 for supplying electric power to the information processing electronic circuit unit 1.

The power source circuitry 31 is comprised of an external power supply detection circuit 311, a start/stop switch 313, a start/stop control circuit 312 and a power supply change-over circuit 314, wherein the state of the external power supply detection circuit 311 and that of the start/stop control circuit 312 are messaged to the information processing electronic circuit unit by way of power-circuit output lines 43 and 44, respectively.

Figure 2:
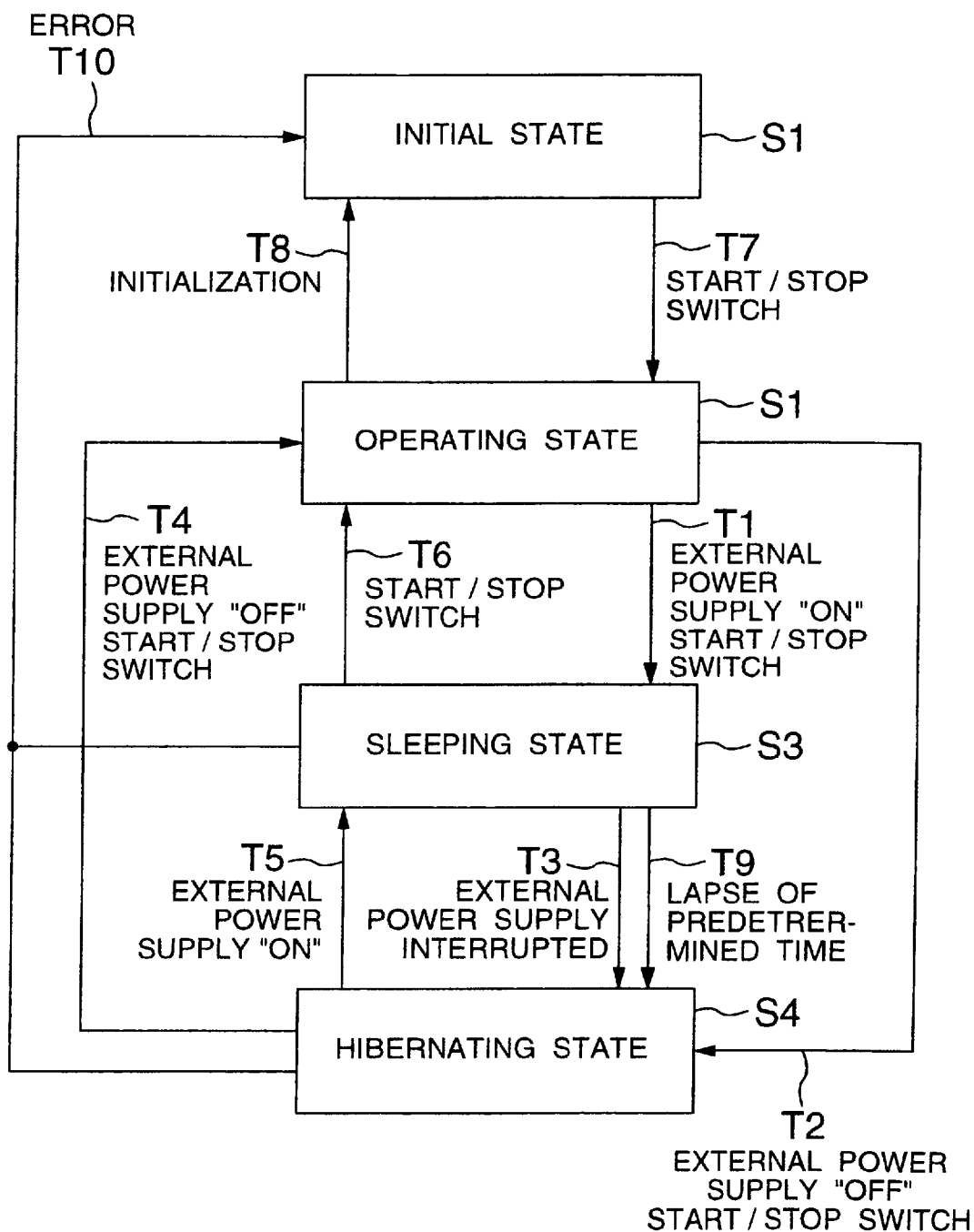
FIG. 2 is a view for illustrating state transitions in the information processing apparatus according to the first embodiment of the invention.

FIG. 2 is a view for illustrating the internal states and the conditions for allowing state transitions in the information processing apparatus according to the first embodiment of the invention. In the information processing apparatus according to the invention, transition may take place among three states, i.e., the operating state S2, the sleeping state S3 and the hibernating state S4 in ordinary use of the apparatus. So long as the transition is taking place among these three states, such processings as reconfiguration, exchange, etc. of the control software (control programs) such as the operating system and the like programs of the information processing apparatus can not be carried out. In other words, the reconfiguration, exchange or the like processing of the control softwares (control programs) such as the OS program of the information processing apparatus is executed during a period in which the internal state of the information processing apparatus is made to transit to the initial state S1 and thence to the operating state S2.

Parenthetically, with the phrase "initial state S1", it is intended to mean a state of the information processing apparatus prevailing immediately after the manufacturing thereof or the state in which the control software (control programs) of the information processing apparatus such as the OS (operating system) program, etc. are restructured in the information processing apparatus.

On the other hand, the phrase "operating state S2" means a state in which the information processing apparatus is capable of carrying out information processing with electric power being supplied to all the electronic circuits incorporated in the information processing apparatus.

Finally, with the phrase "sleeping state S3", it is intended to mean such a state in which the electric power is supplied only to the volatile storage units such as the internal storage unit, the display-dedicated memory and the like and a control circuit required for sustaining the contents stored in the volatile storage units mentioned above. In this sleeping state S3, the power supply to the electronic circuits which is irrelevant to the storage of the internal information is suspended.

Figure 3:
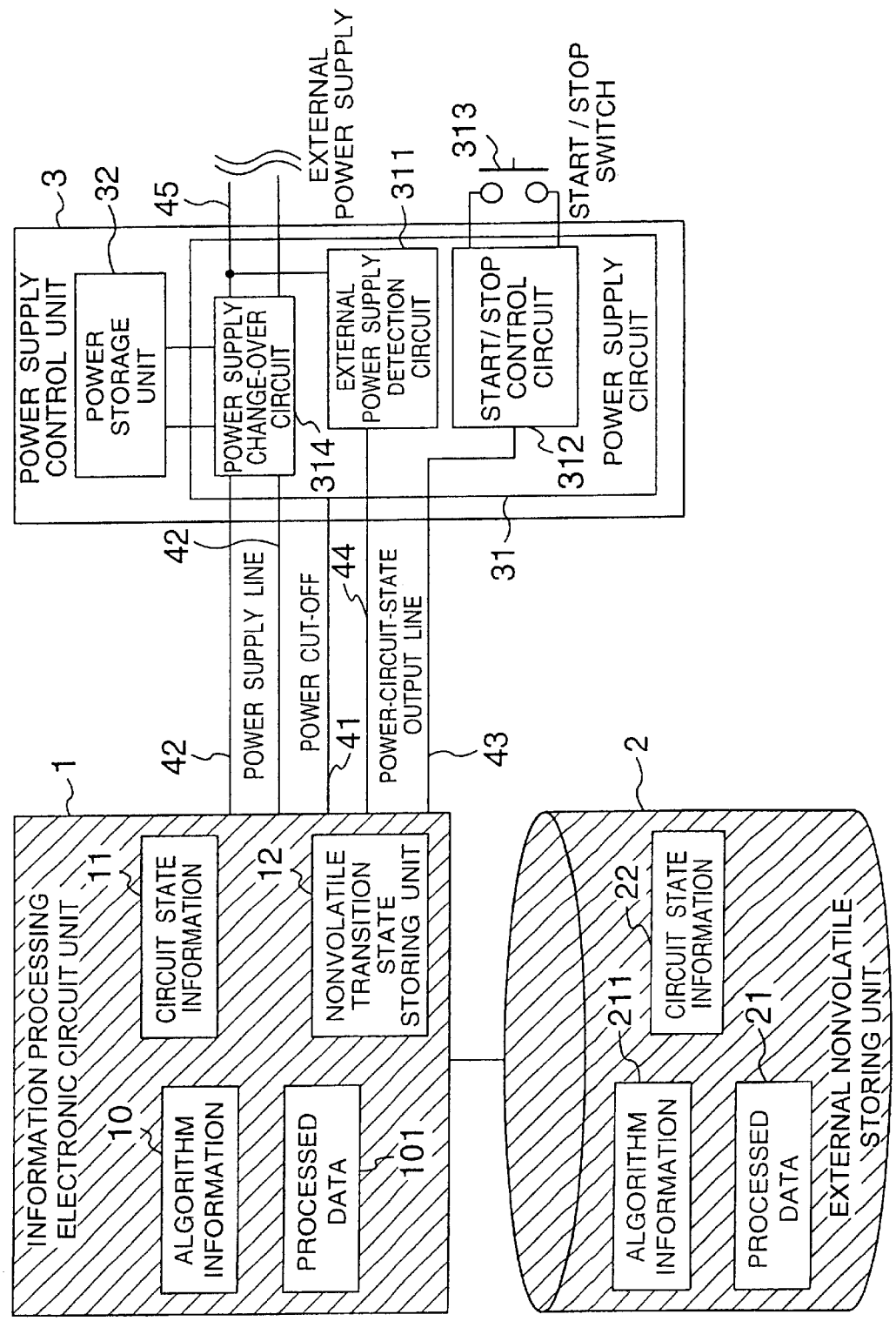
FIG. 3 is a functional block diagram showing schematically and functionally a system configuration of the information processing apparatus (in a sleeping state) according to the first embodiment of the invention.

FIG. 3 is a view for illustrating schematically the sleeping state S3 of the information processing apparatus. In this figure, the units for which the power supply is suspended are indicated by hatching. It can be seen from the figure that the algorithm information 10, the circuit state information 11, the processed data 101 and the power supply control unit 3 are kept validated. At this juncture, it should be mentioned that the sleeping state S3 of the power supply control unit 3 is essentially same as the operating state S2 except that magnitude or level of the electric power supplied to the information processing electronic circuit unit 1 differs between the operating state S2 and the sleeping state S3.

Further, with the phrase "hibernating state S4", it is intended to mean the state in which the volatile information such as the algorithm information 10, the circuit state information 11, the processed data 101 and the like are stored in the associated storing areas 21, 22 and 211, respectively, of the external nonvolatile storage unit 2 with the electric power being supplied only to an external power supply detection circuit 311 and a start/stop control circuit 312 incorporated in the power supply control unit 3.

Figure 4:
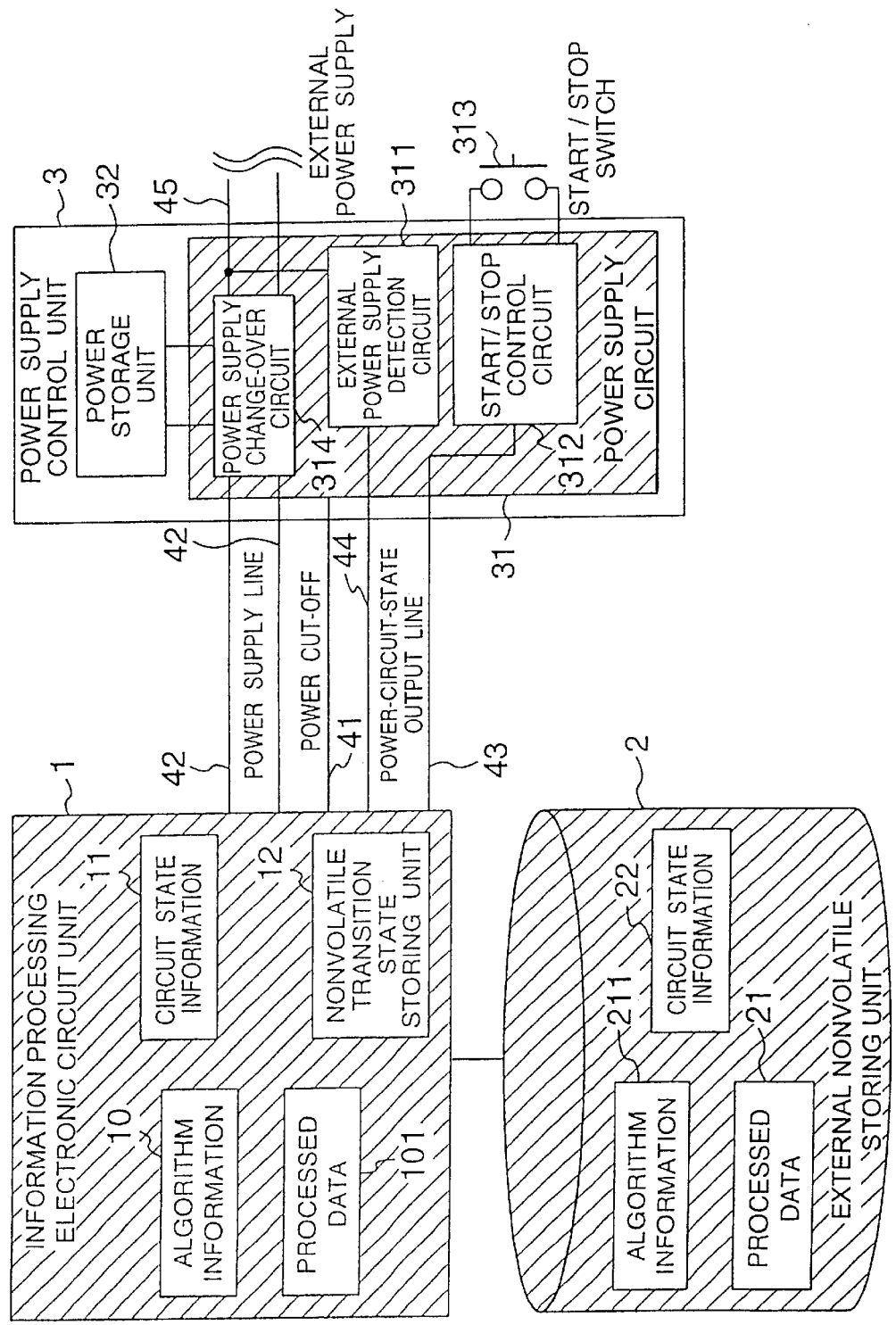
FIG. 4 is a functional block diagram showing schematically and functionally a system configuration of the information processing apparatus (in a hibernating state) according to the first embodiment of the invention.

FIG. 4 is a view for illustrating schematically the hibernating state S4. In this state, the power supply to the units or parts indicated by hatching is suspended. As can be seen in the figure, in the hibernating state S4, the power supply to the external nonvolatile storage unit 2 is stopped or suspended. However, since the external storage unit 2 is nonvolatile, the information or data as stored therein remains to be valid, as indicated by non-hatched areas in FIG. 4. Further, the information stored in the nonvolatile transition state storing unit 12 remains effective in the hibernating state S4.

The information processing apparatus assumes the initial state S1 immediately after the manufacture thereof. Upon manipulation of the start/stop switch 313 by user, electric power is supplied, whereupon the information processing apparatus makes transition to the operating state S2 (see T7, FIG. 2).

The initial state S1 on one hand and the other three states (i.e., operating state S2, sleeping state S3 and hibernating state S4) on the other hand can be discriminated in dependence on whether the control software (control program) such as OS program or the like of the information processing apparatus is activated or not. In the initial state S1, no information has been written yet in the nonvolatile transition state storing unit 12 for storing the states of the information processing apparatus. A rise time period taken for allowing the information processing apparatus to be used by the user from the ordinary power-on of the information processing apparatus represents a transition time for the information processing apparatus to make transition to the operating state S2 from the initial state S1. Upon transition to the operating state S2, identifying information indicating that the information processing apparatus is currently in the operating state S2 and that the preceding state was the initial state S1 is written in the nonvolatile transition state storing unit 12 which is adapted to store the state information of the information processing apparatus, as mentioned previously.

The state transition from the operating state S2 to the sleeping state S3 takes place upon manipulation of the start/stop switch 313 by the user in the state where the external power supply is being validated (T1, FIG. 2).

On the other hand, the state transition to the hibernating state S4 from the operating state S2 takes place upon manipulation of the start/stop switch 313 by the user in the state where the external power supply is broken and the electric power of the built-in power storage unit 32 is utilized or when decision is made that the electric power stored in the built-in power storage unit 32 decreases to a level incapable of maintaining or sustaining the operating state S2 (see T2 in FIG. 2).

Thus, when the information processing apparatus has once made transition to the operating state S2, manipulation of the start/stop switch 313 by the user allows only the state transition of the information processing apparatus to either the sleeping state S3 or the hibernating state S4. So long as the external power supply is effectuated, the information processing apparatus can make transition to the sleeping state S3 from the operating state S2 (T1, FIG. 2). In that case, the identifying information indicating that the information processing apparatus is currently in the sleeping state S3 and that the preceding state was the operating state S2 is written in the nonvolatile transition state storing unit 12 incorporated in the information processing electronic circuit unit 1.

Further, at the time point when the information processing apparatus makes state transition to the sleeping state S3 from the operating state S2, processing for writing the volatile information such as the algorithm information 10, the circuit state information 11, the processed data 101 and the like in the associated storing areas 21, 22 and 211, respectively, of the external nonvolatile storage unit 2 may be performed.

When the information processing apparatus is operating under the power supply from the built-in power storage unit 32 such as the battery without receiving the electric power from the external source, the information processing apparatus makes transition to the hibernating state S4 from the operating state S2 in order to avoid power consumption in the sleeping state S3 (see T2, FIG. 2). In that case, the identifying information indicating that the information processing apparatus is currently in the hibernating state S4 and that the preceding state was the operating state S2 is written in the nonvolatile transition state storing unit 12 which is adapted to store the state information of the information processing apparatus.

When the state of the information processing apparatus is changed over to the initial state S1 for exchanging or updating the control program(s) such as OS program thereof, the information processing apparatus is caused to make transition to the initial state S1 from the operating state S2 (T3 in FIG. 2). This state transition can be realized by performing the processing for invalidating the information stored in the nonvolatile transition state storing unit 12 which is destined for storing the state information of the information processing apparatus as mentioned hereinbefore.

When the information processing apparatus which is assuming the sleeping state S3 detects change in the position or state of the start/stop switch 313 under manipulation by the user, the information processing apparatus makes transition to the operating state S2 (T6, FIG. 2). In that case, identifying information indicating that the information processing apparatus is currently in the operating state S2 and that the preceding state was the sleeping state S3 is written in the nonvolatile transition state storing unit 12 which is adapted to store the state information of the information processing apparatus.

When the external power supply to the information processing apparatus is broken in the sleeping state S3, state transition is made to the hibernating state S4 by utilizing the electric power available from the built-in power storage unit 32 such as the battery (T3, FIG. 2). In that case, the identifying information indicating that the information processing apparatus is currently in the hibernating state S4 and that the preceding state was the sleeping state S3 is written in the nonvolatile transition state storing unit 12 adapted to store the state information of the information processing apparatus. In this conjunction, it is to be noted that utilization of the electric power available from the built-in power storage unit 32 is possible up to a time point at which the processing for storing the volatile information in the external nonvolatile storage unit 2 and the processing for writing the state transition information in the nonvolatile transition state storing unit 12 have been completed.

Furthermore, when the period during which the sleeping state S3 remains unchanged exceeds a predetermined time period, the information processing apparatus is caused to make transition to the hibernating state S4 (see T9 in FIG. 2). In that case, the identifying information indicating that the information processing apparatus is currently in the hibernating state S4 and that the preceding state was the sleeping state S3 is written in the nonvolatile transition state storing unit 12 which is dedicated for storage of the state information of the information processing apparatus. In this way, power consumption of the information processing apparatus which remains unused for a long time can be reduced.

When availability of the external power supply is detected in the information processing apparatus assuming the hibernating state S4, state transition is made to the sleeping state S3 (T5, FIG. 2). In that case, the identifying information indicating that the information processing apparatus is currently in the sleeping state S3 and that the preceding state was the hibernating state S4 is written in the nonvolatile transition state storing unit 12 designed to store the state information of the information processing apparatus.

When the information processing apparatus which is in the hibernating state S4 detects positional or state change of the start/stop switch 313 under manipulation by the user, the apparatus utilizes the external electric power if available, while utilizing the electric power available from the built-in power storage unit 32 when the external power supply is unavailable, to thereby make transition to the operating state S2 (T4, FIG. 2). In that case, the identifying information indicating that the information processing apparatus is currently in the operating state S2 and that the preceding state was the hibernating state S4 is written in the nonvolatile transition state storing unit 12 dedicated for storing the state information of the information processing apparatus.

On the other hand, when the information processing apparatus makes transition to the hibernating state S4 upon interruption of the external power supply after the transition from the hibernating state S4 to the sleeping state S3, the processing for storing the algorithm information 10, the circuit state information 11 and the processed data 101 is not carried out, because any one of the volatile information mentioned above is not updated (T3). The transition to the hibernating state S4 after the transition to the sleeping state S3 from the hibernating state S4 due to breakage of the external power supply can be identified by the absence of the identifying information indicating the transition to the operating state S2 after the transition to the sleeping state S3 in the nonvolatile transition state storing unit 12 dedicated for the storage of the states of the information processing apparatus.

As an unexceptional state transition, there may be mentioned such state transition that the information processing apparatus is forcibly made to transit to the initial state S1 when ordinary state transition can not be realized due to occurrence of software error in the nonvolatile transition state storing unit 12 in the sleeping state S3 or occurrence of destruction of the data stored in the nonvolatile transition state storing unit 12 in the hibernating state S4 (T10, FIG. 2).

Upon detection of change of the start/stop switch 313 by the start/stop control circuit 312 or upon detection of change in the external power supply by the external power supply detection circuit 311, the information processing electronic circuit unit 1 is then supplied with electric power from the power source circuitry 31 by way of the power supply line 42. To this end, the power supply change-over circuit 314 is so designed as to select either the external power supply or the power supply from the built-in power storage unit 32.

In this conjunction, it is to be mentioned that the external power supply detection circuit 311 and the start/stop control circuit 312 are so arranged as to be capable of performing operation so long as the power supply from either one of the built-in power storage unit 32 or the external power supply is validated.

The information processing electronic circuit unit 1, being supplied with electric power, checks the information stored in the nonvolatile transition state storing unit 12 designed for storing the states of the information processing apparatus and the states of the power-circuit-state output lines 43 and 44, to thereby determine the internal state to which transition is to be made and perform the processing as required.

In the state transition from the operating state S2 to the sleeping state S3, such processing is performed which enables the electric power to be supplied only to the volatile storage devices such as the internal storage unit, the display-dedicated memory and the like and the control circuit provided for sustaining the contents stored in the volatile storage devices mentioned above, while suspending the power supply to the electronic circuits which play no role in storing the internal information.

On the other hand, in the state transition of the information processing apparatus from the operating state S2 or the sleeping state S3 to the hibernating state S4, the processing for writing the volatile information such as the algorithm information 10, the circuit state information 11, the processed data 101 and the like in the associated storing areas 21, 22 and 211, respectively, of the external nonvolatile storage unit 2 and as well as the processing for stopping the power supply to the information processing electronic circuit unit 1 with the aid of a power cut-off signal 41 are carried out.

Further, in the state transition from the sleeping state S3 to the operating state S2, processing for enabling electric power supply to the whole information processing electronic circuit unit 1 is executed for thereby allowing the user to use the information processing apparatus.

Furthermore, in the state transition from the hibernating state S4 to the sleeping state S3, the processing for restoring in the internal storage unit, the display-dedicated memory or the like the information stored in the associated storing area 21, 22 and 211 of the external nonvolatile storage unit 2 is carried out.

Additionally, in the state transition from the hibernating state S4 to the operating state S2, such processing is executed which restores in the internal storage unit, the display-dedicated memory or the like the information stored in the respective storing areas 21, 22 and 211 of the external nonvolatile storage unit 2 for thereby allowing the user to use the information processing apparatus by supplying electric power to the whole information processing electronic circuit unit 1.

As can be understood from the above description, the information processing apparatus is basically in the sleeping state S3 when the external power supply is available. Thus, the waiting time intervening between the manipulation of the start/stop switch 313 by the user for booting and attainment of the state in which the user can operate or use the information processing apparatus can be shortened. In this way, there can be realized the user-friendly information processing apparatus which is easy to use or operate.

Embodiment 2

Now, referring to FIGS. 5 to 15, description will be made of the information processing apparatus according to a second embodiment of the present invention.

FIG. 5 is a perspective view showing an outer appearance of the information processing apparatus according to the second embodiment of the invention.

The information processing apparatus designated by numeral 5 is comprised of a main unit 50 including a CPU (central processing unit) and a storage unit, etc., an information input unit 531 and an image display unit 58. The main unit 50 is equipped with an operation suspending switch 533 and an external power supply control device 574, and supplied with electric power from an external source by way of a power supply line 45.

The external power supply control device 574 is constituted by a mechanical switch for determining whether the external electric power is to be supplied or cut off. Ordinarily, this switch is set to the closed state by the user of the information processing apparatus. The operation suspending switch 533 for suspending the operation of the information processing apparatus 5 to allow the state transition to the sleeping state S3 is incorporated in an operation suspending manipulation unit which is designed to generate an interrupt signal to be sent to the main unit 50. The transition from the sleeping state S3 to the operating state S2 is realized in response to an input signal from the operation suspending switch 533 or the information input unit 531.

Figure 6:
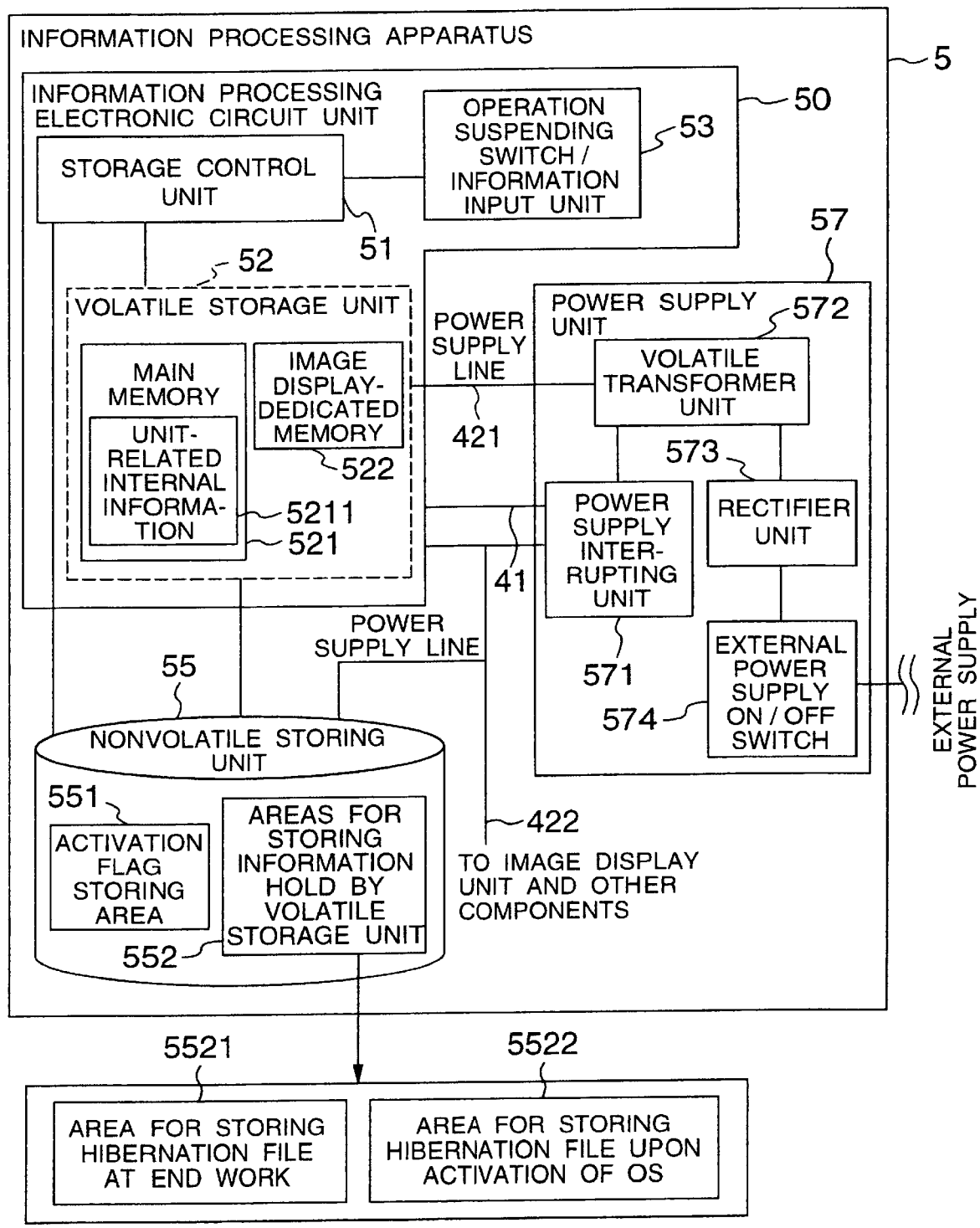
FIG. 6 is a functional block diagram showing schematically a functional configuration of major portions of the information processing apparatus according to a second embodiment of the invention.

FIG. 6 is a functional block diagram showing schematically a structure of the information processing apparatus 5. The information processing apparatus according to the instant embodiment of the invention is imparted with a function for restoring the state prevailed when operation was suspended and a function for restoring the state prevailed upon starting of operation in case the information processing apparatus fails to restore the state prevailed when operation was suspended for some reason or in response to the relevant command of the user.

The information processing apparatus 5 according to the second embodiment of the invention includes at least the main unit 50, a nonvolatile storage unit 55 and a power supply unit 57.

The main unit or information processing electronic circuit unit 50 is comprised of a storage control unit 51, a volatile storage unit 52, and an operation suspending switch/information input unit 53.

The volatile storage unit 52 includes a main memory 521 and a display-dedicated memory 522, wherein unit-related internal information 5211 is stored in the main memory 521.

The nonvolatile storage unit 55 is internally provided with an area 552 for storing data of the volatile storage unit and an activation flag storing area 551 for storing flag information which is referenced upon execution of start or activation processing.

The area 552 of the nonvolatile storage unit 55 for storing the data of the volatile storage unit includes a subarea for storing the information of the information processing apparatus upon suspension of operation, i.e., a hibernation file area 5521 for storing a hibernation file upon completion of work, an area for storing the information at the time point the operating system of the information processing apparatus is activated, i.e., a hibernation file area 5522 for storing the hibernation file upon activation of the OS program. Incidentally, a file having recorded therein the information saved in the nonvolatile storage device is referred to as the hibernation file.

The power supply unit 57 is provided with at least two power supply lines, i.e., a power supply line 421 for the volatile storage unit 52 and the device for holding the contents of the volatile storage unit 52 and a power supply line 422 for other devices.

Provided in association with the power supply line 422 for supplying electric power to the other devices than the volatile storage unit 52 and the device for holding the contents thereof is a power supply interrupting unit 571 which can be controlled by the information processing electronic circuit unit 50.

Figure 7:
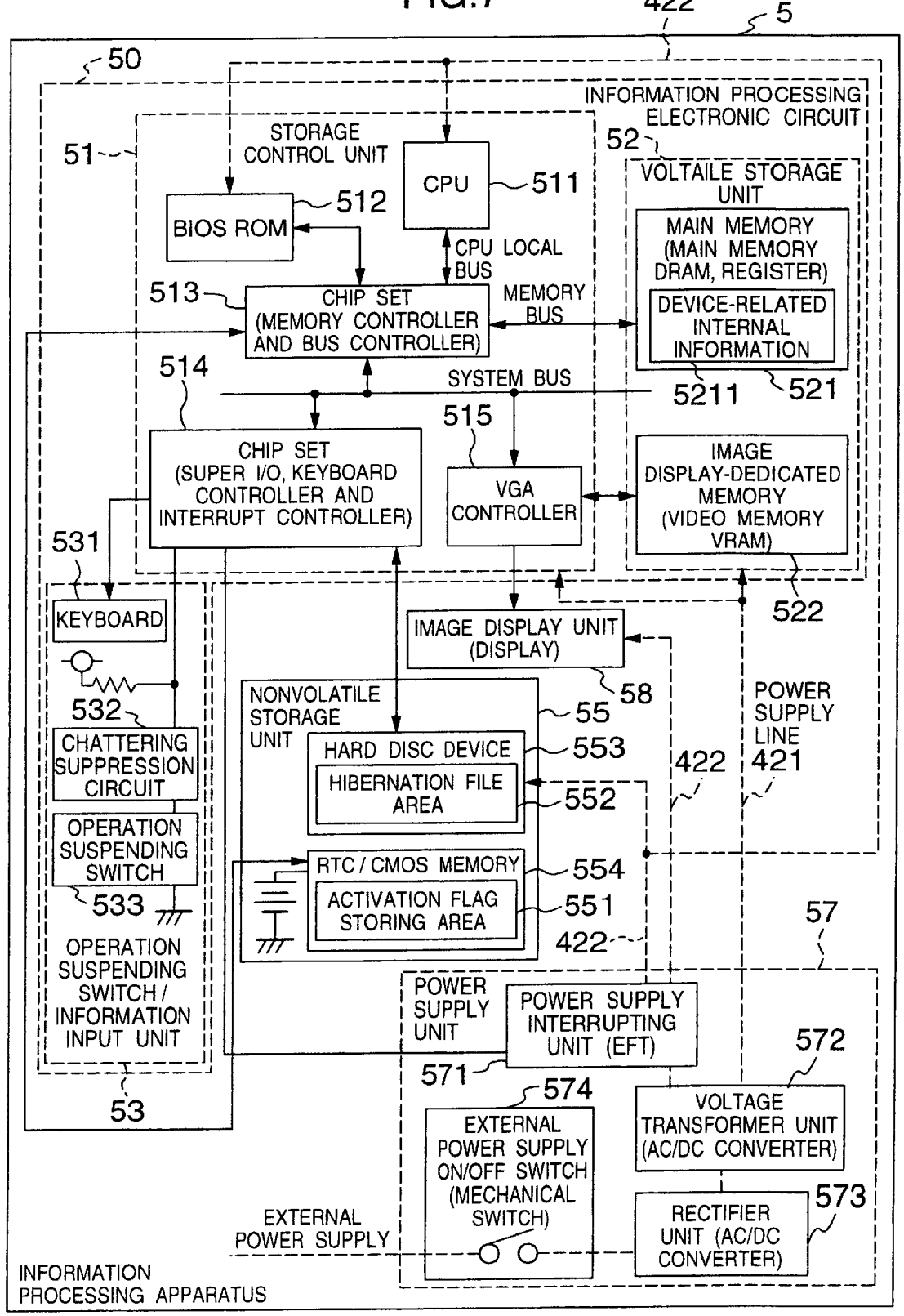
FIG. 7 is a functional block diagram showing in detail a functional structure of the information processing apparatus according to the second embodiment of the invention.

Now, description will be made in more detail the structure or configuration of the information processing apparatus 5 by referring to a functional block diagram shown in FIG. 7.

The information processing apparatus 5 is comprised of an information processing electronic circuit unit 50, a nonvolatile storage unit 55, a power supply unit 57 and an image display unit 58.

The information processing electronic circuit unit 50 is comprised of a storage control unit 51, a volatile storage unit 52 and an operation suspending switch/information input unit 53.

The storage control unit 51 incorporated in the information processing electronic circuit unit 50 is comprised of a CPU (central processing unit) 511, a BIOS ROM (basic input-output system read-only memory) 512, a chip set 513 having functions as a memory controller and a bus controller, respectively, a chip set 514 having functions as a super input/output controller, a keyboard controller and an interrupt controller, respectively, and a VGA (video graphics array) controller 515.

The volatile storage unit 52 is comprised of a (DRAM (dynamic random access memory) a register in each controller) 521 serving as a main memory and a VRAM (video random access memory) 522 serving as a display-dedicated memory, wherein the main memory 521 includes a unit-related internal information storing area 5211 for storing the device-related internal information.

The operation suspending switch/information input unit 53 is comprised of a keyboard 531, a chattering suppression circuit (anti-chattering circuit) 532, and an operation suspending switch 533 for changing over the voltage set ordinarily at high level to the ground potential level.

The nonvolatile storage unit 55 is comprised of a hard disk device 553 and a RTC/CMOS 554. The hard disk device 553 is provided with an area 552 for storing the data of the volatile storage unit. The area 552 includes an area 5521 for storing a hibernation file created upon suspension of operation and an area 5522 for storing a hibernation file created upon activation of the OS program. Further, an activation flag storing area 551 is provided in the RTC/CMOS memory 554.

The power supply unit 57 is comprised of a power supply interrupting unit 571 which may be constituted by a FET (field effect transistor), a DC/DC converter 572 serving as voltage transformer unit, an AC/DC converter 573 serving as a rectifier unit, and a mechanical switch 574 serving as an external power supply on/off switch.

Of the power supply lines 421 and 422, the latter for supplying electric power to the other devices than the volatile storage unit 52 and the device for holding the contents thereof is connected to the storage control unit 51, the hard disk device 553 of the nonvolatile storage unit 55 and the image display unit 58, respectively, by way of the power supply suspending unit (FET) 571. A time measuring circuit is not specified in the drawings, but incorporated in BIOS ROM 512 shown in FIG. 7 and also incorporated in the transition state storing unit 12 shown in FIGS. 1, 3 and 4.

Figure 8:
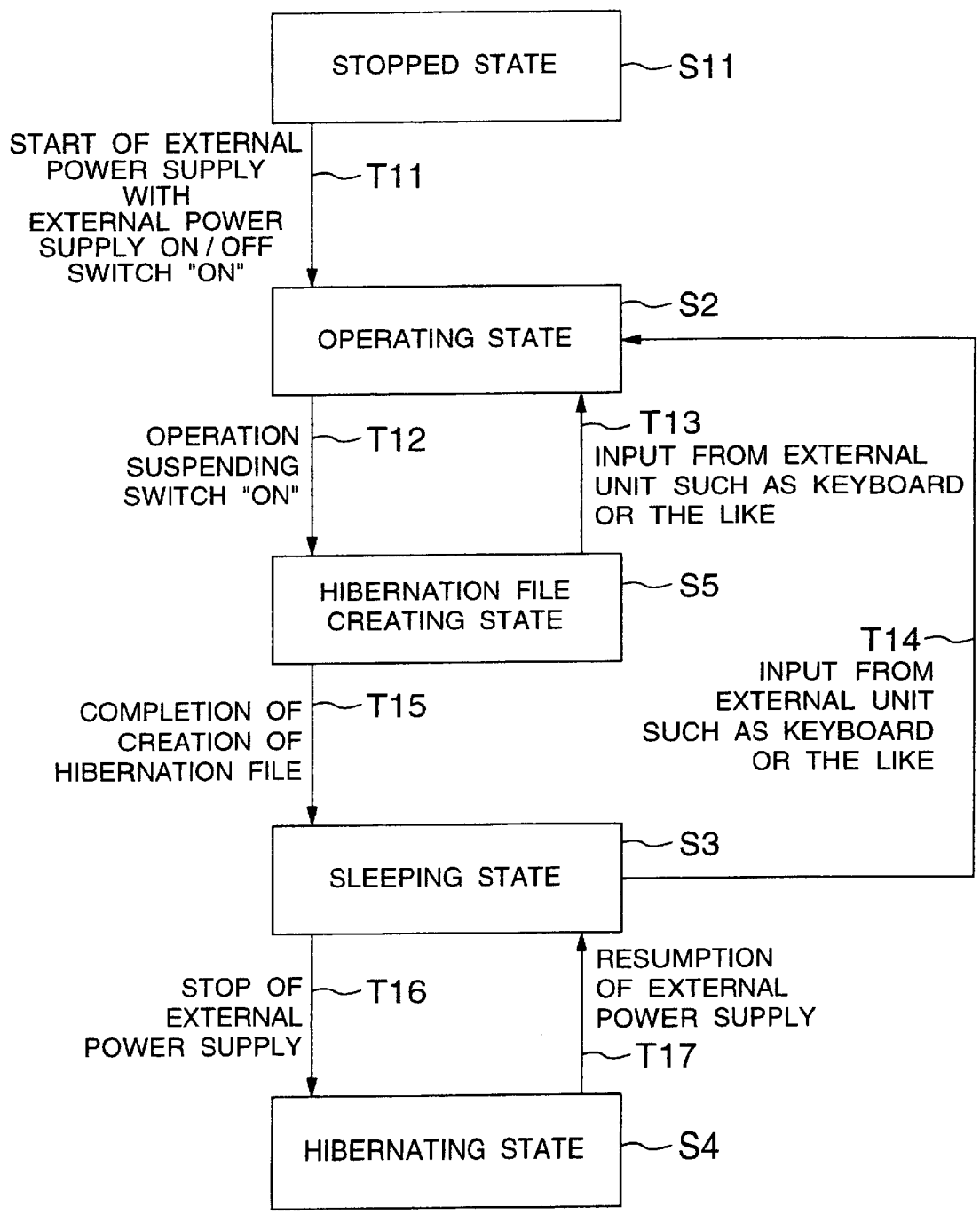
FIG. 8 is a chart for illustrating states which the information processing apparatus according to the second embodiment of the invention can assume and conditions for enabling state transitions.

Now referring to FIG. 8, description will be directed to the states which the information processing apparatus according to the instant embodiment of the invention can assume and the conditions for the state transitions.

The information processing apparatus according to the second embodiment of the invention can assume a stopped state S11, an operating state S2, a sleeping state S3, a hibernating state S4 and a hibernation file creating state S5, respectively.

The terms "stopped state S11" means such state in which the information processing apparatus 5 is not yet supplied with electric power from an external power source and in which the external power supply on/off switch 574 is opened or off. Upon power-on of the information processing apparatus 5 in this stopped state S11 with electric power being supplied externally and the switch 574 being turned on, activation processing is started. Upon OS booting in succession to the activation processing, a hibernation file is created, whereon the information processing apparatus 5 makes transition to the operating state S2 (T11 in FIG. 8).

In the operating state S2, works can be performed by using the information processing apparatus 5. For ending or suspending the work, the user turns on the operation suspending switch 533. In that case, the information processing apparatus makes transition to the hibernation file creating state S5 (T12, FIG. 8).

In the hibernation file creating state S5, the information held in the volatile storage unit 52 is saved for storage in the nonvolatile storage unit 55 upon suspension of operation of the information processing apparatus. In this conjunction, it should be mentioned that when some signal is inputted from an external input device such as keyboard or the like in the course of saving the information, the information saving job is interrupted, whereon the information processing apparatus 5 makes transition to the operating state S2 (T13, FIG. 8).

Upon completion of creation of the hibernation file with all the information stored in the volatile storage unit 52 having been saved, the corresponding hibernation file is stored in the activation flag storing area 551 of the nonvolatile storage unit 55, whereupon the information processing apparatus makes transition to the sleeping state S3 (T15, FIG. 8).

By contrast, in the case where priority or preference is put on the hibernation file created upon OS activation under the command of the user, the information saving processing is not performed. In that case, the information processing apparatus makes transition to the sleeping state S3 after storing the corresponding hibernation information in the activation flag storing area 551 of the nonvolatile storage unit 55.

In the sleeping state S3, power supply to the volatile storage unit 52 and the relevant circuits or devices thereof is not stopped, but the power supply to the image display unit 58 and the like devices or circuits which are irrelevant to the function for resuming the state prevailing upon suspension of operation is disabled.

The user can handle or regard the sleeping state S3 as an ordinary power-off state. In the volatile storage unit 52, the information at the time point the operation suspending switch 533 is turned on is sustained as it is. When the external device such as the information input unit 531 or the like is manipulated with the corresponding signal being inputted to the information processing apparatus, the power supply is immediately restarted to the device(s) and/or circuit(s) for which the power supply has been suspended. Thus, the information processing apparatus makes transition to the operating state S2, allowing the user to restart the work (T14, FIG. 8).

On the other hand, when the external power supply to the information processing apparatus 5 is stopped in the sleeping state S3, the information processing apparatus 5 makes transition to the hibernating state S4 (T16).

The hibernating state S4 differs from the stopped state S11 in that the external power supply on/off switch 574 remains closed or ON with the hibernation file being held in the nonvolatile storage unit 55. Further, in the hibernating state S4, the activation flag assumes a value differing from that in the stopped state S11.

On the other hand, when the external power supply to the information processing apparatus 5 is restarted in the hibernating state S4, the information processing apparatus 5 starts immediately the activation processing and makes transition to the sleeping state S3 (T17). Ordinarily, through this activation processing, the information saved to the nonvolatile storage unit 55 in the hibernation file creating state S5 upon suspension of operation is restored to the volatile storage unit 52. In this conjunction, it is to be noted that in case the above-mentioned restoration of the information to the volatile storage unit 52 fails or when priority is assigned to the restoration of the state prevailed upon OS activation, the hibernation file created upon state transition from the stopped state S11 to the operating state S2 (T11, FIG. 8) is restored.

Figure 9:
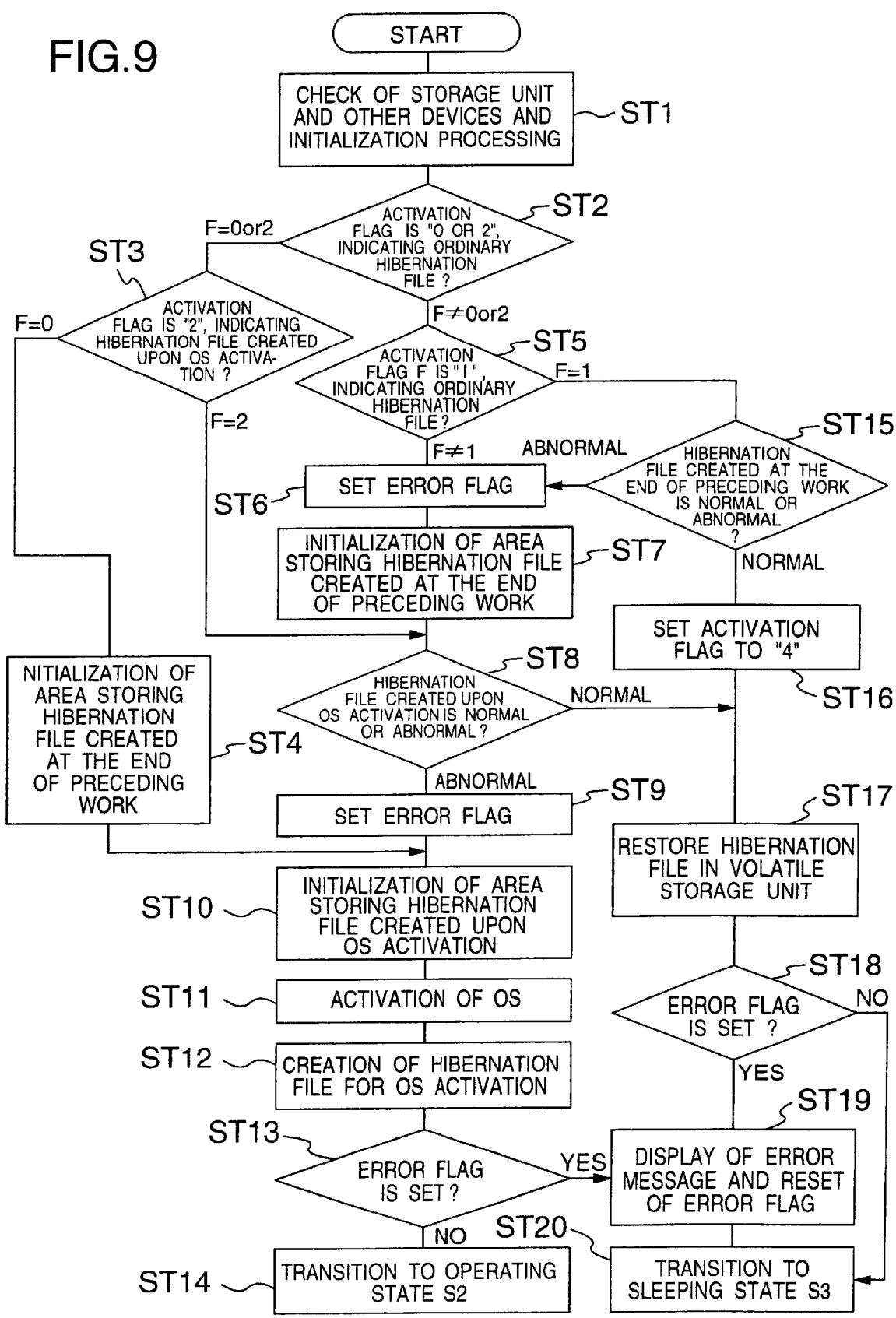
FIG. 9 is a flow chart for illustrating activation processing procedures for starting or activating the information processing apparatus according to the second embodiment of the invention from a stopped state and a hibernating state.

Next, referring to a flow chart shown in FIG. 9, activation processings (or boot processings) for realizing the state transition from the stopped state S11 and the hibernating state S4 shown in FIG. 8 (T11, T17) will be described. Parenthetically, the processing for executing this activation processing is resident in the BIOS ROM 512.

At first, a flow of the activation processing performed, starting from the stopped state S11 i.e., transition T11 will be described.

Upon starting of the activation processing, the CPU 511 makes access to the address allocated to the BIOS ROM 512 to thereby execute in accordance with the program written therein the processings for recognition or confirmation of capacity of the main memory incorporated in the information processing apparatus 5, device check such as check of hard disk unit and others, and initialization processing (step ST1).

Subsequently, the CPU 511 makes decision by reference to the activation flag F recorded in the activation flag storing area 551 of the RTC/CMOS memory 554 whether the activation is from the stopped state S11 or from the hibernating state S4 or alternatively it is rebooting (step ST2).

In the case of activation from the stopped state S11, the activation flag F is of the initial value "0". The activation flag check step (ST2) branches to a step ST3 when the activation flag F is "0" or "2", while it branches to a step ST5 when the activation flag F assumes the other value than "0" and "2".

Figures 10, 13:
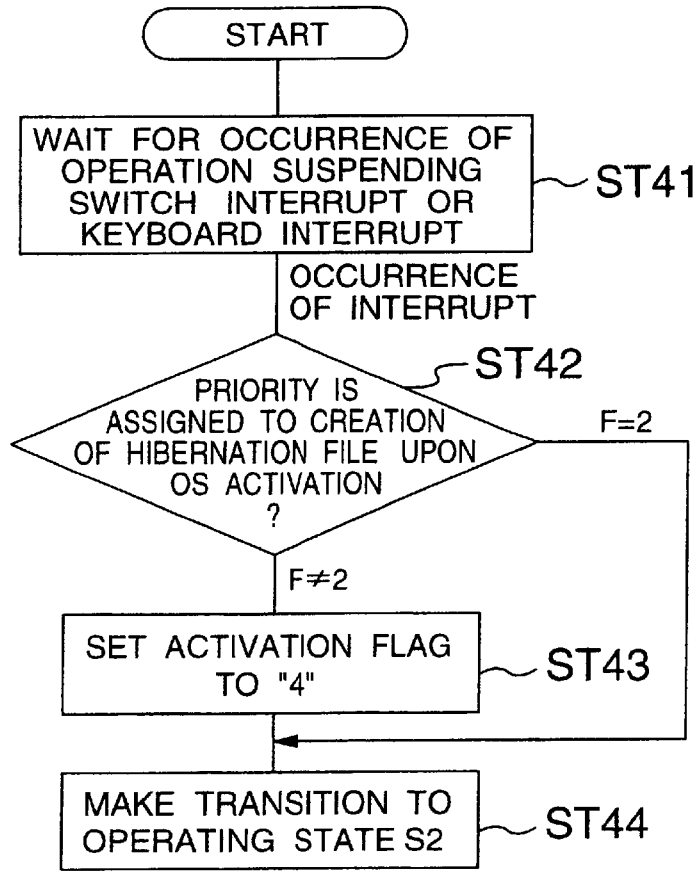
FIG. 10 is a view for illustrating values of activation flag and relevant functions thereof.
FIG. 13 is a flow chart for illustrating processings executed in a sleeping state of the information processing apparatus according to the second embodiment of the invention.

FIG. 10 is a view for illustrating the values which the activation flag F can assume together with relevant functions. The activation flag F of "0" indicates the initial value or the stopped state. The activation flag F of "1" indicates the ordinary hibernating state in which the hibernation file has been stored in the hard disk unit at the normal end of the processing. The activation flag F of "2" represents OS-activation-related hibernation and indicates the state where the OS program is activated by using the hibernation file created upon activation of the OS program. The activation flag F of "3" indicates the hibernation file creation starting state corresponding to the transitive state T12 shown in FIG. 8. Upon normal end, the activation flag F is set to "1". The activation flag F of "4" indicates the hibernation file restoring state corresponding to the state transition T14 shown in FIG. 8.

When it is decided in the step ST2 that the activation flag F is "0" or "2", then decision is made in a step ST3 whether the activation flag F is "0" or alternatively it is "2". In case the activation flag F is "0", the area storing the hibernation file created at the end of the preceding work is initialized in a step ST4, which then followed by a step ST10 where the area of the hibernation file created upon OS activation is initialized, whereon the OS activation processing is started (step ST11). At the time point the OS program is activated, the information stored in the volatile storage unit 52 upon OS activation is saved in the area of the nonvolatile storage unit 55 which has been initialized in the step ST4, whereupon the hibernation file relevant to the OS activation is created in a step ST12.

At the time point the OS program has been activated, the processing is transferred to the OS program. In this conjunction, it should be added that when the OS program, being activated, can not call a system BIOS program, the processing may be transferred to the system BIOS by resorting to a predetermined hardware interrupt.

After completion of the hibernation file, error flag check is performed in a step ST13. However, there is no possibility that the error flag is valid up to the current processing step, i.e., the decision step ST13 results in negation or "NO". Accordingly, state transition to the operating state S2 takes place (step ST14).

On the other hand, when it is decided in the step ST3 that the activation flag F is "2", the hibernation file created upon OS activation is checked in a step ST8. When abnormality is found in the hibernation file, error flag is set in a step ST9, and the area storing the hibernation file created upon OS activation is initialized in a step ST10. In secession, processing similar to that described previously when the activation flag F is "0" is carried out.

Next, description will be directed to the activation from the hibernating state S4 (i.e., the state transition T17 shown in FIG. 8). After having checked the individual devices in the step ST1, the routine branches to the ordinary hibernation file processing. However, when the user selects with priority the hibernation file created upon OS activation, then the OS-activation-related hibernation processing is executed.

When the result of the check in the step ST2 indicates that the activation flag F is neither "0" nor "2", then it is checked in the step ST5 whether the activation flag F is "1".

When the result of the check in the step ST5 shows that the value of the activation flag F is other than "1", the error flag is set (step ST6), and the area storing the hibernation file created at the end of the preceding work is initialized in a step ST7. Thereafter, the processing proceeds to the step ST8 mentioned previously.

In the case of creation of the ordinary hibernation, the value of the activation flag F is "1". The first activation flag is checked in the step ST2, and the processing branches to the step ST5 when the activation flag F is neither "0" nor "2". Further, in the step ST5, the activation flag is checked to ascertain the stored state of the hibernation file.

When the activation flag F is "1", this means that the hibernation file has been created normally at the end of the preceding work. Accordingly, file check is performed in a step ST15. When the file is normal, the activation flag F is set to "4" in a step ST16, whereon the information indicating restoration of the hibernation file is saved. In a step ST17, the hibernation file is restored in the volatile storage unit 52. There is no possibility that the error flag is set (step ST18). Consequently, transition is made to the sleeping state S3 in a step ST20.

On the other hand, when it is decided in the step ST15 that the file is abnormal for some reason such as damage of the file, additional installation of memory, alteration of the hardware configuration of the information processing apparatus or when the activation flag F is detected as assuming other value than "1" in the activation flag check step ST5, then error flag is set in the step ST6, whereupon the area for the hibernation file created at the end of the preceding work is renewedly initialized in the step ST7. Parenthetically, unless error is detected, the error flag is set to "0". If otherwise, the error flag is set to "1". Further, the error flag is not stored in the nonvolatile storage device such as the activation flag storing area but contained as one of variables of the activation processing program developed on the volatile main memory. In succession, the hibernation file created upon OS activation is checked in the step ST8. When no abnormality is detected, the hibernation file is restored on the volatile storage unit. In a step ST19, an error message is displayed, which is then followed by the state transition to the sleeping state S3.

When the decision step ST8 also results in abnormality, error flag is set in the step ST9. In this case, however, the value of the error flag remains actually unchanged because the error flag has already been set in the step ST6. Subsequently, the area for the hibernation file created upon OS activation is renewedly initialized in the step ST10. Thereafter, the OS activation processing is performed in a step ST11 through similar procedure as in the case of the activation from the stopped state S11. At the time point the OS is activated, the information stored in the volatile storage unit 52 is saved in the area of the nonvolatile storage unit 55 which has been initialized, whereupon OS-activation-related hibernation file is created in the step ST12.

In this case, the processing is transferred to the OS program at the time point the OS program has been activated, similarly to the procedure in the case of activation from the stopped state S11. In this conjunction, it should be added that when the OS program, being activated, can not call a system BIOS program, the processing may be transferred to the system BIOS by resorting to a predetermined hardware interrupt.

Thereafter, the error flag is checked in a step ST13. Since the error flag is valid in the steps ST6 and ST9 (i.e., since the decision step ST13 results in affirmation or "YES"), an error message is displayed in a step ST19, whereupon state transition is made to the sleeping state in a step ST20.

In case of priority is put to the hibernation file created upon OS activation, as desired by the user, the first activation flag check (step ST2) will result in that the activation flag F is "2", and the succeeding activation flag check in the step ST3 will equally result in that the activation flag F is "2". Consequently, the processing for the hibernation file created at the end of the preceding work is skipped to proceed to the check of the hibernation file created upon the OS activation (step ST8). Thereafter, the processing similar to that described previously is carried out. Parenthetically, in case the hibernation file created upon OS activation is restored onto the volatile storage unit, the value of the activation flag is not altered.

Starting or resuming of the information processing apparatus can be realized by setting the activation flag F stored in the nonvolatile storage device to the initial value "0" to thereby perform the activation processing from the stopped state S11.

FIG. 11 is a flow chart for illustrating processing steps executed in the hibernation file creating state S5 of the information processing apparatus according to the second embodiment of the invention. The program for executing this processing is resident in the BIOS (basic input/output system) ROM (read-only memory) 512. When the operation suspending switch 533 is actuated in the operating state S2, execution of the processing illustrated in FIG. 11 is started (state transition T12).

At first, processings of all the programs currently making access to the nonvolatile storage unit 55 are terminated (step ST31). Subsequently, the address contained in a vector table of keyboard interrupt and operation suspending switch interrupt is rewritten to the address at which a program for suspending the creation of the hibernation file and restoring the operating state is located (step ST32).

Subsequently, decision is made as to whether or not the priority is to be assigned to the creation of hibernation file upon OS activation (step ST33). In case the activation flag F is "2", no hibernation file for the suspension of the current operation is created but the state transition is immediately made to the sleeping state S3 (corresponding to the transition T15 shown in FIG. 8). When it is decided in the step ST33 that the value of the activation flag F is other than "2", the activation flag F is set to "3" (step ST34), and the information concerning the start of creation of the hibernation file is stored in the activation flag area. Thereafter, the current contents of the volatile storage unit are saved to the nonvolatile storage device, and the hibernation file for the suspension of operation is created (step ST35).

Upon completion of creation of the hibernation file without encountering occurrence of the keyboard interrupt and the operation suspending switch interrupt, the activation flag F is set to "1", and the corresponding information is stored in the activation flag storing area (step ST36), whereupon state transition is made to the sleeping state S3 in a step ST37 (corresponding to the transition T15 shown in FIG. 8).

When a keyboard interrupt signal or an interrupt signal originating in the operation suspending switch 533 is detected in the course of processing succeeding to the step ST32, the processing then branches to a step ST38 in accordance with rewritten vector address, whereupon the rewritten vector address is altered to the original address (step ST38), and transition is made to the operating state S2 with creation of the hibernation file being suspended in the step ST39 (corresponding to the transition T13 shown in FIG. 8).

Figure 12:
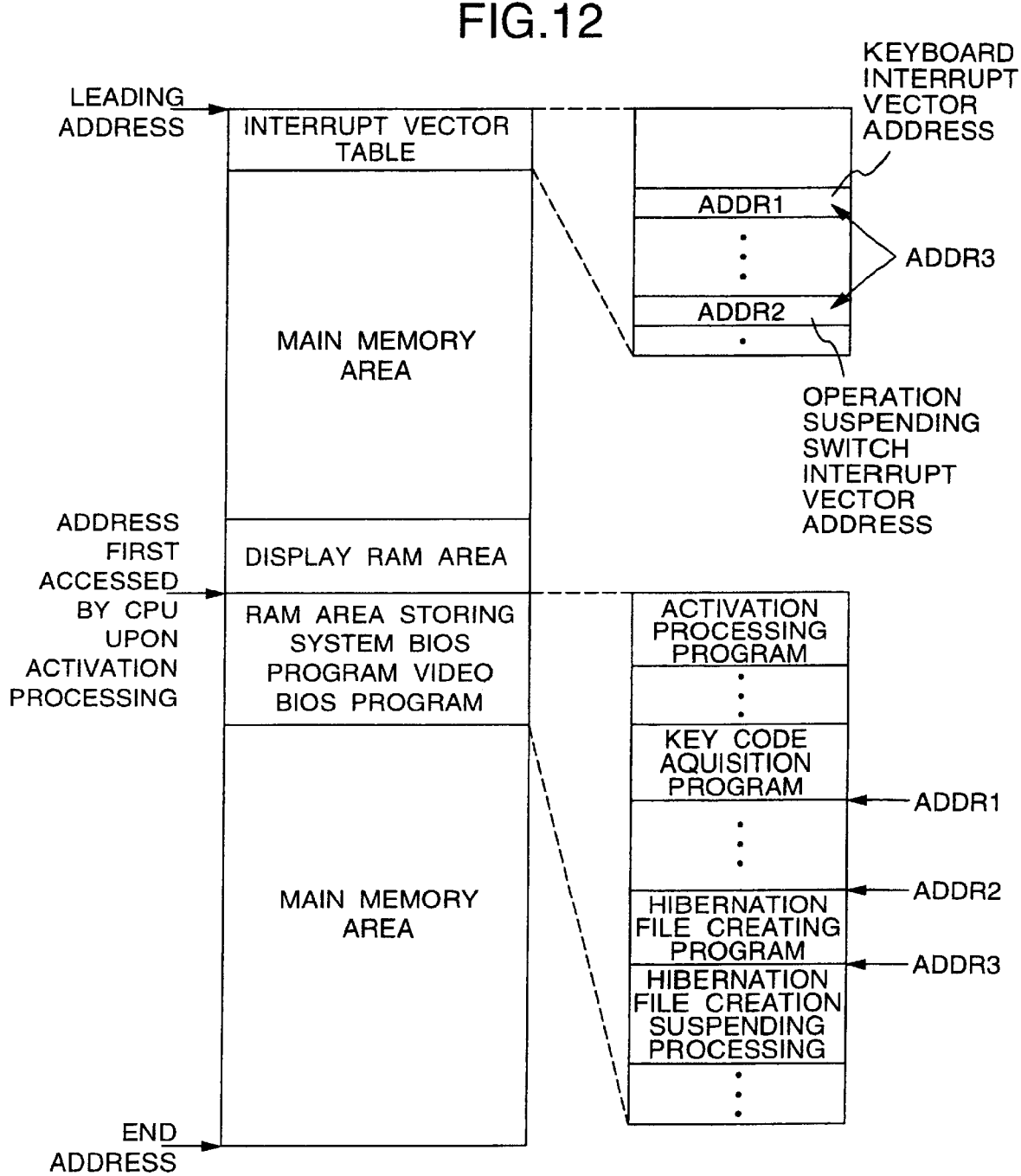
FIG. 12 is a view showing schematically a memory map in the information processing apparatus according to the second embodiment of the invention.

Description will now turn to a memory configuration adopted in the information processing apparatus according to the instant embodiment of the invention by reference to FIG. 12 which shows schematically a memory map.

When the operation suspending button switch is pushed, the processing of a hibernation file creating program located in a ROM area is started in accordance with operation suspending button interrupt address ADDR2 contained in the interrupt vector table (a portion located in the vicinity of the leading address of the memory and containing interrupt vector addresses).

The addresses contained in the interrupt vector table and rewritten in the step ST32, as mentioned previously, are the operation suspending button interrupt vector address ADDR2 and the keyboard interrupt vector address ADDR1. Parenthetically, the keyboard interrupt vector address ADDR1 designates the leading address of a key code acquisition program located in a ROM area. Both of the keyboard interrupt vector address ADDR1 and the operation suspending button interrupt vector address ADDR2 are rewritten to a leading address ADDR3 of a hibernation file creating state suspension processing program. Thus, when interrupt takes place in the hibernation file creating state with the keyboard or the operation suspending switch being actuated, then the processing jumps to the leading address ADDR3. Through the processing, starting from the leading address ADDR3, the interrupt vector address rewritten in the processing step ST38 is restored to the original keyboard interrupt vector address ADDR1 and the operation suspending button interrupt vector address ADDR2, whereupon the processing carried out before the time point at which the hibernation file creating state program was interrupted is restored, whereupon transition is made to the operating state S2.

Next, description with reference to FIG. 13 will turn to the processing to be performed in the sleeping state S3.

The program for executing this processing is resident in the BIOS ROM 512. After transition to the sleeping state S3, the information processing apparatus is set to the state for waiting for occurrence of the operation suspending switch interrupt or the keyboard interrupt (step ST41). So long as the interrupt does not occur, the processing can not proceed beyond the step ST41.

When the interrupt occurs, decision is made as to whether or not the priority is put to the creation of hibernation file upon OS activation by checking the activation flag F (step ST42).

In case where the activation flag F is "2", indicating preference put on creation of the hibernation file upon OS-activation, state transition is made immediately to the operating state S2 (step ST44) (corresponding to transition T14 shown in FIG. 8). When it is decided in the step ST42 that the value of the activation flag F is not "2", the activation flag F is set to "4", indicating restoration of the hibernation file (step ST43), whereon transition is made to the operating state S2 (step ST44).

Figure 14:
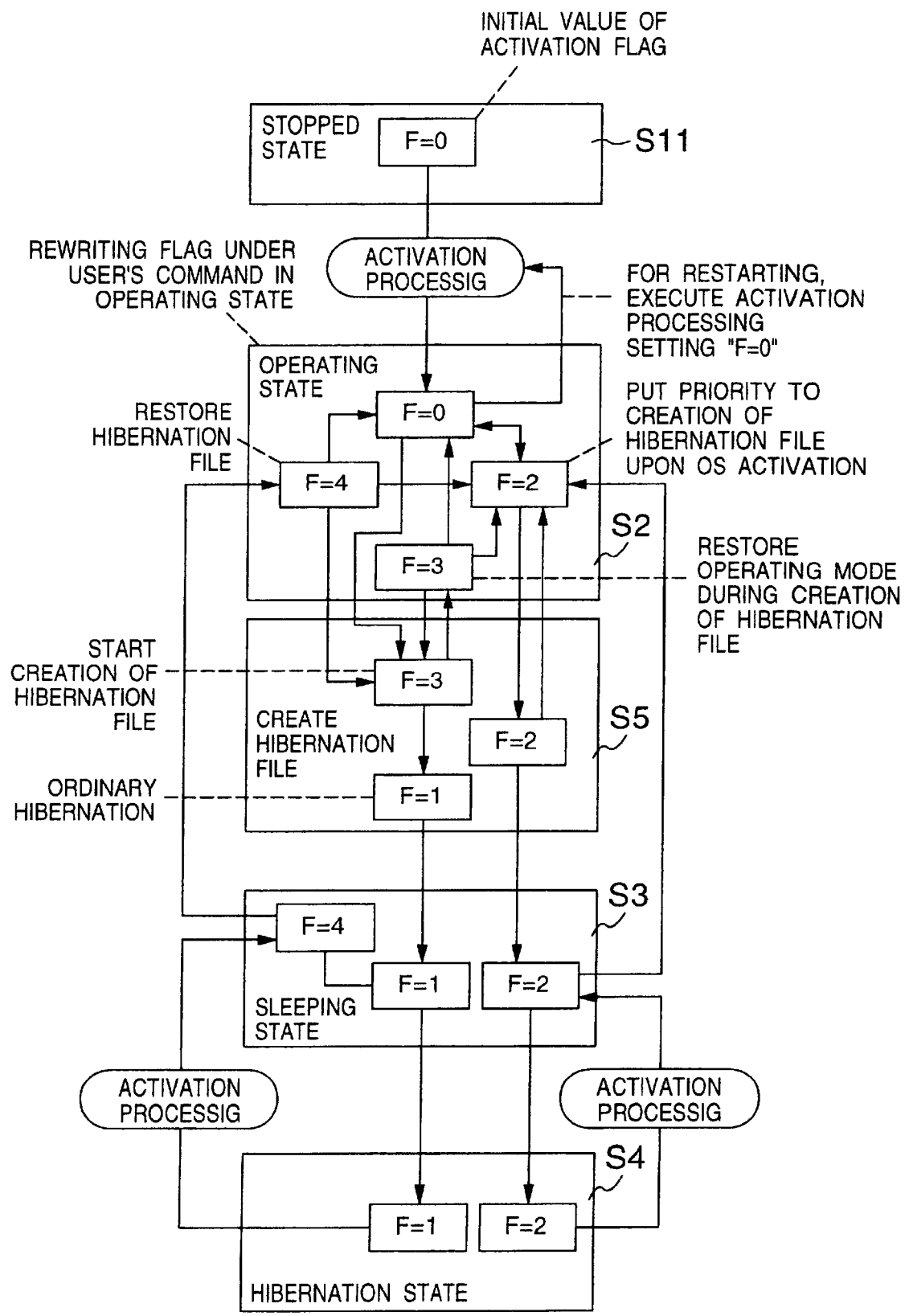
FIG. 14 is a view for illustrating schematically relationships between individual state transitions and changes of the activation flag in the information processing apparatus according to the second embodiment of the invention.

FIG. 14 is a view illustrating schematically relationships between the individual state transitions and the changes of the activation flag F in summary. In the stopped state S11, the activation flag F assumes the initial value of "0". After the activation processing, transition is made to the operating state S2. At this time point, the value of the activation flag F remains In the operating state S2, the value of the activation flag F is changed to "2" in case the priority is to be put on creation of the hibernation file upon OS-activation in dependence on the command inputted by the user. On the other hand, when the information processing apparatus is to be rebooted, the activation flag F is changed to "0". Parenthetically, the reboot processing can straightforwardly be transit to the activation processing.

In the operating state S2, the activation flag F may assume in addition to the value "0" or "2" the value "4" after restoration of the hibernation file or the value "3" when the operating state S2 is restored with creation of the hibernation file being suspended. In other words, in the operating state S2, the activation flag F may assume one of the four value "0", "2", "3" and "4".

At this juncture, it should be mentioned that in the operating state S2, actuation of the operation suspending switch 533 causes transition to the processing in the hibernation file creating state S5 regardless of any state of the activation flag F.

More specifically, when the operation suspending switch 533 is pushed, state transition straightly to the sleeping state S3 occurs when the activation flag F is "2". Otherwise, the activation flag F will be set to "3" upon starting of creation of the hibernation file with the state transition having been made to the hibernation file creating state S5. After completion of creation of the hibernation file, the activation flag F is set to "1", whereon state transition occurs to the sleeping state S3.

In the case where the activation flag F is "1" upon state transition to the operating state S2 from the sleeping state S3, then the activation flag F is set to "4", whereon the operating state S2 is restored. By contrast, in the case where the activation flag F is "2", the operating state S2 is restored straightforwardly.

Further, transition to the hibernating state S4 can be realized intactly when the activation flag F is "1" or "2".

When external power supply is restarted in the hibernating state S4, activation processing is performed when the activation flag F is "1", indicating the ordinary hibernation file, and transition is made to the sleeping state S3 with the activation flag F being set to "4" after the activation processing. In the case of the hibernation file created upon OS-activation with the activation flag F being "2", state transition is made to the sleeping state S3 after activation processing and then the operating state S2 is resumed with the activation flag F remaining "2".

Figure 15:
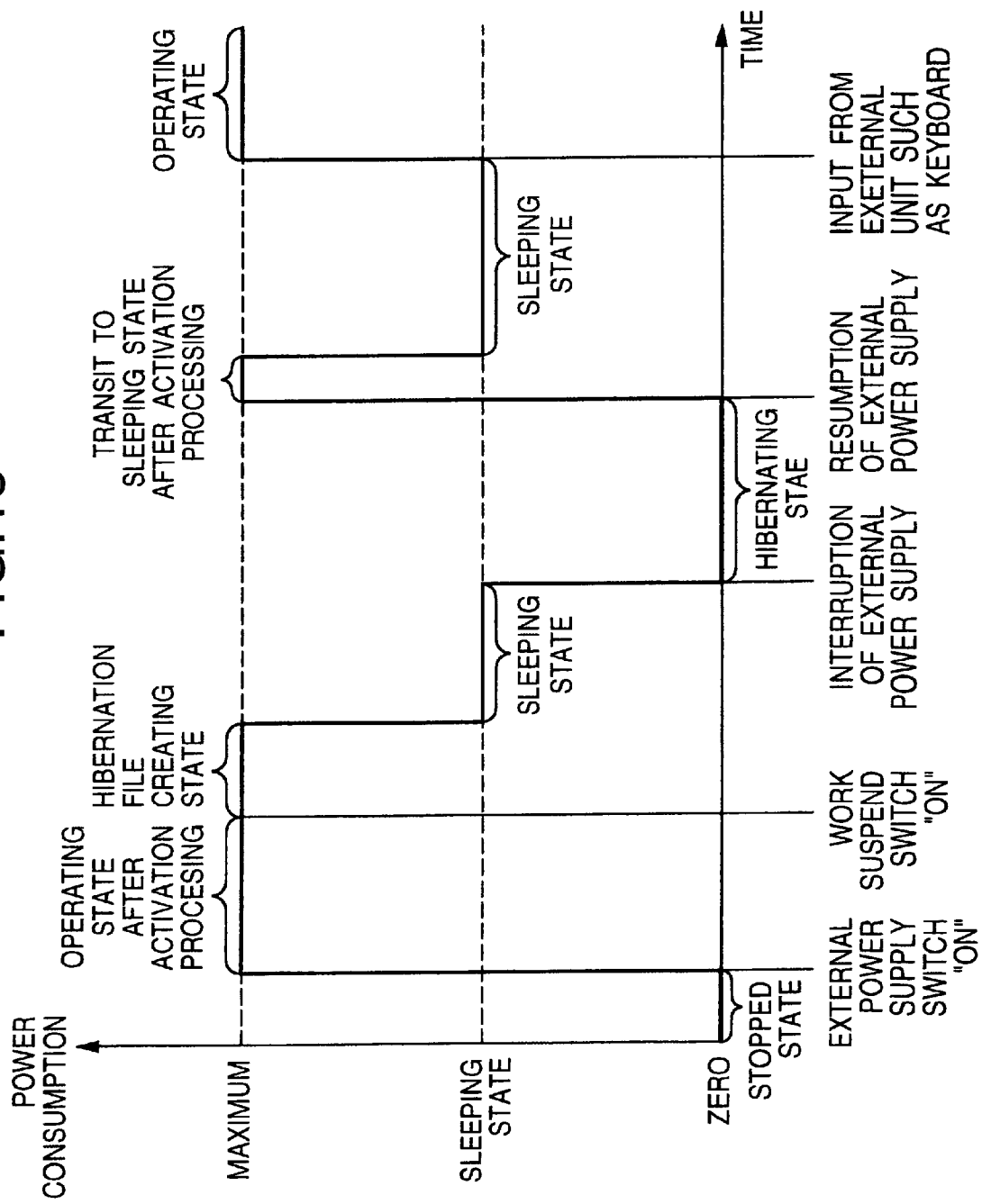
FIG. 15 is a view for illustrating graphically relationships between the individual state transitions of the information processing apparatus and power consumption thereof.

Now referring to FIG. 15, description will be directed relationships between the individual state transitions of the information processing apparatus and power consumption thereof. In FIG. 15, power consumption is taken along the ordinate while taken along the abscissa are state transitions of the information processing apparatus as a function of time lapse.

In the stopped state S11, the power consumption is zero. When the external power supply is started from this state with the external power supply on/off switch being turned on to allow the activation processing (operating state S2) to be validated, the power consumption will reach a maximum level as in the case of the operating state S2.

In the hibernation file creating state S5 validated by turning on the operation suspending switch, the control program continues to be maximum.

When the information processing apparatus assumes the sleeping state S3 after the hibernation file creation processing, the power consumption lowers by a proportion corresponding to the power consumption of the parts to which power supply has now been stopped.

When the external power supply is stopped, the power consumption naturally becomes zero with the information processing apparatus assuming the hibernating state S4.

Upon restarting of the external power supply, the information processing apparatus starts immediately the activation processing from the hibernating state S4. At this time point, the power consumption becomes maximum.

Subsequently, at the end of the activation processing, transition is made to the sleeping state S3. Accordingly, the power consumption is suppressed. The information processing apparatus resumes the same state as the operation-suspended state.

Embodiment 3

A third embodiment of the present invention will be described by reference to FIG. 16. According to the invention incarnated in this embodiment, the information processing apparatus is implemented in the form of a portable type information processing apparatus 5'.

The portable type information processing apparatus 5' is comprised of a main unit 50' and an image display unit 58'. In the portable type information processing apparatus 5', an operation suspending switch 533' is disposed in the vicinity of a root portion of a rotatable connector through which the main unit 50' and the image display unit 58' are coupled together. When the image display unit 58' is closed or folded onto the main unit 50', the operation suspending switch 533' is pushed.

By virtue of the arrangement described above, the user may simply close the image display unit 58' onto the main unit 50' upon suspension or termination of work, whereby procedure to this end can be much simplified. Further, by opening the image display unit 58' from the closed or folded state, the work restart operation or processing is executed. Thus, there can be realized a very handy portable type information processing apparatus.

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An information processing apparatus including at least a processing unit, a storage unit and a display unit, comprising:

volatile storage means and nonvolatile storage means each for storing at least algorithm information for processings executed by said processing unit, processed data inclusive of display-destined data generated in said storage unit, and circuit state information concerning individual circuits incorporated in said information processing apparatus during operation of the information processing apparatus; and control means for setting a predetermined operation-mode state in accordance with predetermined rules of transition so as to store selectively said algorithm information, said data and said circuit state information in said volatile storage means and said nonvolatile storage means in dependence on conditions imposed externally through manipulating operation.

2. An information processing apparatus according to claim 1, wherein said predetermined operation-mode state includes an operating state in which electric power is supplied to all of electronic circuits incorporated in said information processing apparatus;

a sleeping state in which the electric power is supplied to a control circuit for controlling said volatile storage means for sustaining storage of said algorithm information, said processed data and said circuit state information, the electric power being supplied to said control means as well; and a hibernating state in which said algorithm information, said display-destined data and said processed data are stored in said nonvolatile storage means and in which electric power is supplied to a part of said control means.

3. An information processing apparatus according to claim 2, wherein said predetermined operation-mode state includes a hibernation file creating state in which said algorithm information, said processed data and said circuit state information stored in said volatile storage means are transferred to said nonvolatile storage means at a predetermined time point after activation of said information processing apparatus.

4. An information processing apparatus according to claim 1, wherein said nonvolatile storage means is comprised of a nonvolatile storage circuit incorporated in said processing unit for storing identifying information for identifying discriminatively current operation-mode state and preceding operation-mode state.

5. An information processing apparatus according to claim 4, wherein said nonvolatile storage means includes a time measuring circuit designed for operating in a sleeping state.

6. An information processing apparatus according to claim 4, wherein said nonvolatile storage means includes at least state transition processing means for making said information processing apparatus transit to an operating state, a sleeping state or a hibernating state in accordance with rules of transition.

7. An information processing apparatus according to claim 6, wherein said state transition processing means includes computer programming code means for making said information processing apparatus transit to said sleeping state when said information processing apparatus is in said hibernating state and when availability of an external power supply is detected by an external power supply detection circuit.

8. An information processing apparatus according to claim 6, wherein said state transition processing means includes computer programming code means for making said information processing apparatus transit to said hibernating state when said information processing apparatus is in said sleeping state and when interruption of an external power supply is detected by an external power supply detection circuit.

9. An information processing apparatus according to claim 6, wherein said state transition processing means includes computer programming code means for making said information processing apparatus transit to either one of said sleeping state or said hibernating state, when said information processing apparatus is in said operating state and when said start/stop control circuit indicates a stopped state and when availability of an external power supply is detected by an external power supply detection circuit.

10. An information processing apparatus according to claim 6, wherein said state transition processing means includes computer programming code means for making said information processing apparatus transit to said hibernating state when said information processing apparatus is in said sleeping state and when a time measuring circuit detects a lapse of a predetermined time.

11. An information processing apparatus according to claim 6, wherein said state transition processing means includes identifying computer programming code means for identifying discriminatively upon activation of said information processing apparatus a case where state transition is to be made to said operating state from either said hibernating state or said sleeping state and a case where said information processing apparatus is to be resumed.

12. An information processing apparatus according to claim 6, wherein said state transition processing means includes reboot computer programming code means for resuming said information processing apparatus after activation thereof.

13. An information processing apparatus according to claim 6, wherein said state transition processing means includes start/stop computer programming code means for identifying discriminatively availability or unavailability of an external power supply as detected by an external power supply detection circuit and a start or stop state of a start/stop control circuit to thereby execute either processing for allowing state transition from said sleeping state to said operating state or processing for allowing state transition from said hibernating state to said operating state in dependence on a result of said identification.

14. An information processing apparatus according to claim 6, wherein said state transition processing means includes computer programming code means for storing in said nonvolatile storage means said identifying information for identifying discriminatively said current operation-mode state and said preceding operation-mode state.

15. An information processing apparatus according to claim 6, wherein said state transition processing means includes computer programming code means for transferring said internal information concerning individual relevant circuits as stored in said volatile storage means to said nonvolatile storage unit when said information processing apparatus makes transition to said sleeping state from said operating state.

16. An information processing apparatus according to claim 15, wherein said state transition processing means includes computer programming code means for allowing said external power supply to be stopped by a start/stop control circuit on a condition provided that said transfer of said internal information has been completed upon state transition of said information processing apparatus from said sleeping state to said hibernating state.

17. An information processing apparatus according to claim 6, wherein said state transition processing means includes computer programming code means for allowing said internal power supply means to execute either state transition from said operating state to said sleeping state or state transition from said operating state to said hibernating state upon stoppage of said external power supply.

18. An information processing apparatus according to claim 6, wherein said state transition processing means includes computer programming code means for allowing at least said algorithm information, said processed data and said circuit state information to be held in said volatile storage means when said information processing apparatus is operating while allowing said algorithm information, said processed data and said circuit state information to be transferred from said volatile storage means to said nonvolatile storage means upon suspension of operation of said information processing apparatus, and allowing said algorithm information, said processed data and said circuit state information stored in said nonvolatile storage means to be transferred to said volatile storage means upon restarting of operation of said information processing apparatus.

19. An information processing apparatus according to claim 18, wherein said state transition processing means includes reboot computer programming code means for resuming said information processing apparatus by using said algorithm information, said processed data an d said circuit state information stored in said volatile storage means when an external power supply detection circuit detects an external power supply in a state where operation of said information processing apparatus is being suspended.

20. An information processing apparatus according to claim 18, wherein said state transition processing means includes computer programming code means for transferring said algorithm information, said processed data and said circuit state information stored in said nonvolatile storage means to said volatile storage means when an external power supply detection circuit detects unavailability of an external power supply during suspension of operation of said information processing apparatus and when said external power supply detection circuit detects subsequently availability of said external power supply, to thereby allow the suspended state of said operation to be continued.

21. An information processing apparatus according to claim 18, wherein said state transition processing means includes computer programming code means for suspending at a given timing transfer of said algorithm information, said processed data and said circuit state information stored in said volatile storage means to said nonvolatile storage means upon suspension of operation of said information processing apparatus, to thereby allow said information processing apparatus to make transition to said operating state.

22. An information processing apparatus according to claim 18, wherein said state transition processing means includes computer programming code means for transferring to said nonvolatile storage means at least two or more kinds of said algorithm information, two or more kinds of said processed data and two or more kinds of said circuit state information held in said volatile storage means at different time points in the course of operation of said information processing apparatus, while transferring given ones of said two or more kinds of said algorithm information, said two or more kinds of processed data and said two or more kinds of circuit state information to said volatile storage means upon resuming of said information processing apparatus.

23. An information processing apparatus according to claim 1,
wherein said control means includes
an external power supply detection circuit for detecting change of external power supply; and
a start/stop control circuit for commanding start and stop of operation of said information processing apparatus.

24. An information processing apparatus according to claim 23,
wherein said control means includes an internal power supply circuit and a power supply change-over circuit for exchanging said internal power supply and said external power supply with each other.

25. An information processing apparatus comprising:
a volatile storage unit for storing internal information of the information processing apparatus; and
a control unit for allowing a read of the internal information from said volatile storage unit in response to an interruption of an external power supply to the information processing apparatus with a part of devices in the information processing apparatus halted in accordance with an interrupting instruction to store the internal information in a nonvolatile storage unit connected with the information processing apparatus.

26. An information processing apparatus according to claim 25, wherein said control unit allows to read out the internal information from said nonvolatile storage unit to be stored in said volatile storage unit in accordance with a return of the external power supply to the information processing apparatus.

27. An information processing apparatus according to claim 25, wherein said internal information includes at least one of processed data and algorithm information in an internal storage unit.

28. An information processing apparatus according to claim 25, wherein said volatile storage unit includes at least one of a main memory and a image display dedicated memory.

29. An information processing apparatus according to claim 25, further comprising:
a power storage unit for supplying the power to the information processing apparatus in response to the interruption of the external power supply to the information processing apparatus.

30. An information processing apparatus according to claim 25, wherein said part of devices in the information processing apparatus includes at least a device except said volatile storage unit and said control unit.

31. A method of storing internal information in an information processing apparatus, comprising the steps of:
storing the internal information in a volatile storage unit;
halting an operation of a part of devices in the information processing apparatus in accordance with an interrupting instruction; and
reading out the internal information from said volatile storage unit in response to an interruption of an external power supply to the information processing apparatus with said part of devices in the information processing apparatus halted to store the internal information in a nonvolatile storage unit.

32. An information processing apparatus, comprising:
an internal storage unit storing internal information of the information processing apparatus; and
a control unit for reading out the internal information from said internal storage unit in response to an interruption of an external power supply to the information processing apparatus with a part of devices in the information processing apparatus halted in accordance with an interrupting instruction to store the internal information in an external storage unit connected with the information processing apparatus.

33. An information processing apparatus, comprising:
a volatile storage unit for storing internal information of the information processing apparatus;
a nonvolatile storage unit; and
a control unit for reading out the internal information from said volatile storage unit in response to an interruption of an external power supply to the information processing apparatus with a part of devices in the information processing apparatus halted in accordance with an interrupting instruction to store the internal information in said nonvolatile storage unit.

34. An information processing apparatus, comprising:
a volatile storage unit for storing internal information of the information processing apparatus; and
control unit for storing the internal information in a nonvolatile storage unit connected with the information processing apparatus during a held time of halting a part of devices in the information processing apparatus in accordance with an interrupting instruction.

35. An information processing apparatus according to claim 34, wherein said held time is determined previously.

36. An information processing apparatus comprising:
a control unit;
a volatile storage unit; and
a nonvolatile storage unit,
wherein said information processing apparatus includes a first state for allowing a processing operation of the apparatus, a second state for holding a power supply to said volatile storage unit and said control unit while interrupting the power supply to other device in the information processing apparatus, and a third state for storing information in said volatile storage unit in said nonvolatile storage unit while interrupting the power supply to said volatile storage unit, and
wherein said control unit allows a transition bilaterally between the second state and third state.

37. An information processing apparatus according to claim 36, wherein said control unit allows the transition bilaterally between the second state and third state in accordance with a condition of an external power supply to the information processing apparatus.

38. An information processing apparatus according to claim 37, wherein said control unit allows a transition from the second state to the third state in accordance with an interruption of the external power supply to the information processing apparatus.

39. An information processing apparatus according to claim 37, wherein said control unit allows a transition from the third state to the second state in accordance with a return of the external power supply to the information processing apparatus.

40. An information processing apparatus according to claim 36, wherein said control unit allows a transition from at least one of the first state to the second state and the second state to the first state in accordance with an interrupting information.

41. An information processing apparatus according to claim 36, further comprising:
   a detection circuit for detecting a signal condition of an external power supply line to the information processing apparatus,
   wherein said control unit allows the transition bilaterally between the second state and the third state in accordance with a signal condition of an external power supply line.

42. An information processing apparatus according to claim 41, further comprising:
   a power storage unit for storing the power; and
   a switching circuit for switching the power from the external power supply and said power storage unit to the information processing apparatus in accordance with the signal condition of the external power supply line.

43. An information processing apparatus comprising:
   a volatile storage unit for storing internal information in the information processing apparatus; and
   a control unit for previously allowing a plurality of hibernation files in an area of a nonvolatile storage unit to restore the internal information in accordance with an instruction at a predetermined time and store the plurality of hibernation files in the nonvolatile storage unit,
   wherein said plurality of hibernation files includes a first hibernation file area at an end work and a second hibernation file area on activation of an operating system.

44. An information processing apparatus according to claim 43, wherein the area of said nonvolatile storage unit is at least the same area of said first and second hibernation files.

45. An information processing apparatus according to claim 43, wherein one of said first and second hibernation files is previously determined by a user in an operating state of the information processing apparatus whether the one of said first and second hibernation files is used.

46. An information processing apparatus comprising:
   a volatile storage unit for storing internal information in the information processing apparatus; and
   a control unit for previously allowing a plurality of hibernation files in an area of a nonvolatile storage unit to restore the internal information in accordance with an instruction at a predetermined time and store the plurality of hibernation files in the nonvolatile storage unit,
   wherein the hibernation files are transited from a hibernation state to a sleeping state after resuming operation.

* * * * *